(12) United States Patent
Riggs

(10) Patent No.: US 9,368,989 B2
(45) Date of Patent: Jun. 14, 2016

(54) BATTERY CHARGER AND FUEL CELL

(75) Inventor: Allan Riggs, Rockledge, FL (US)

(73) Assignee: ARGOPOWER, LLC, Rockledge, FL (US)

( * ) Notice: Subject to any disclaimer, the term of this patent is extended or adjusted under 35 U.S.C. 154(b) by 292 days.

(21) Appl. No.: 14/006,599

(22) PCT Filed: Mar. 22, 2012

(86) PCT No.: PCT/US2012/030190
§ 371 (c)(1),
(2), (4) Date: Nov. 15, 2013

(87) PCT Pub. No.: WO2012/129441
PCT Pub. Date: Sep. 27, 2012

(65) Prior Publication Data
US 2014/0062382 A1 Mar. 6, 2014

Related U.S. Application Data

(60) Provisional application No. 61/466,423, filed on Mar. 22, 2011.

(51) Int. Cl.
*H02J 7/00* (2006.01)
*H01M 16/00* (2006.01)
*H01M 4/46* (2006.01)
*H01M 6/34* (2006.01)
*H01M 6/50* (2006.01)

(52) U.S. Cl.
CPC ............... *H02J 7/0054* (2013.01); *H01M 4/46* (2013.01); *H01M 6/34* (2013.01); *H01M 6/5033* (2013.01); *H01M 16/00* (2013.01)

(58) Field of Classification Search
CPC ......... Y02E 60/50; H01M 8/00; H02J 7/0052
USPC ........... 320/101, 107; 429/400–402, 405, 508
See application file for complete search history.

(56) References Cited

U.S. PATENT DOCUMENTS

| | | | |
|---|---|---|---|
| 4,390,602 A | 6/1983 | Struthers | |
| 5,362,577 A | 11/1994 | Pedicini | |
| 6,123,854 A | 9/2000 | Iwane et al. | |
| 6,313,605 B1 * | 11/2001 | Tsenter | H02J 7/0073 320/125 |
| 6,660,426 B2 | 12/2003 | Hampe et al. | |
| 7,442,334 B2 | 10/2008 | Hara et al. | |
| 2004/0142227 A1 * | 7/2004 | Sugai | H01M 8/0271 429/457 |
| 2006/0158150 A1 | 7/2006 | Yen | |
| 2008/0166629 A1 | 7/2008 | Shiau | |
| 2009/0035653 A1 | 2/2009 | Shiau | |

OTHER PUBLICATIONS

International Search Report mailed Nov. 15, 2012 in corresponding International Application No. PCT/2012/030190.
The Enviro-Gen 12 Saltwater Generator: An Ideal Power Source for Boaters, Campers, etc. Dragonet. Aug. 31, 2010 [retrieved on Aug. 31, 2012]. Retrieved from the Internet: <URL:http://dragonet.com/fhp/>. pp. 1-4.

* cited by examiner

*Primary Examiner* — Paul Dinh
(74) *Attorney, Agent, or Firm* — Miles & Stockbridge P.C.; David R. Schaffer

(57) ABSTRACT

A non-electric battery charging fuel cell system that includes a fuel cell system with a closed internal chamber and at least one magnesium anode and a cathode pair that is electrically connected to eternally accessible battery positions designed to receive rechargeable batteries. The addition of saltwater to fill the fuel cell begins the generation of electricity to recharge batteries.

18 Claims, 24 Drawing Sheets

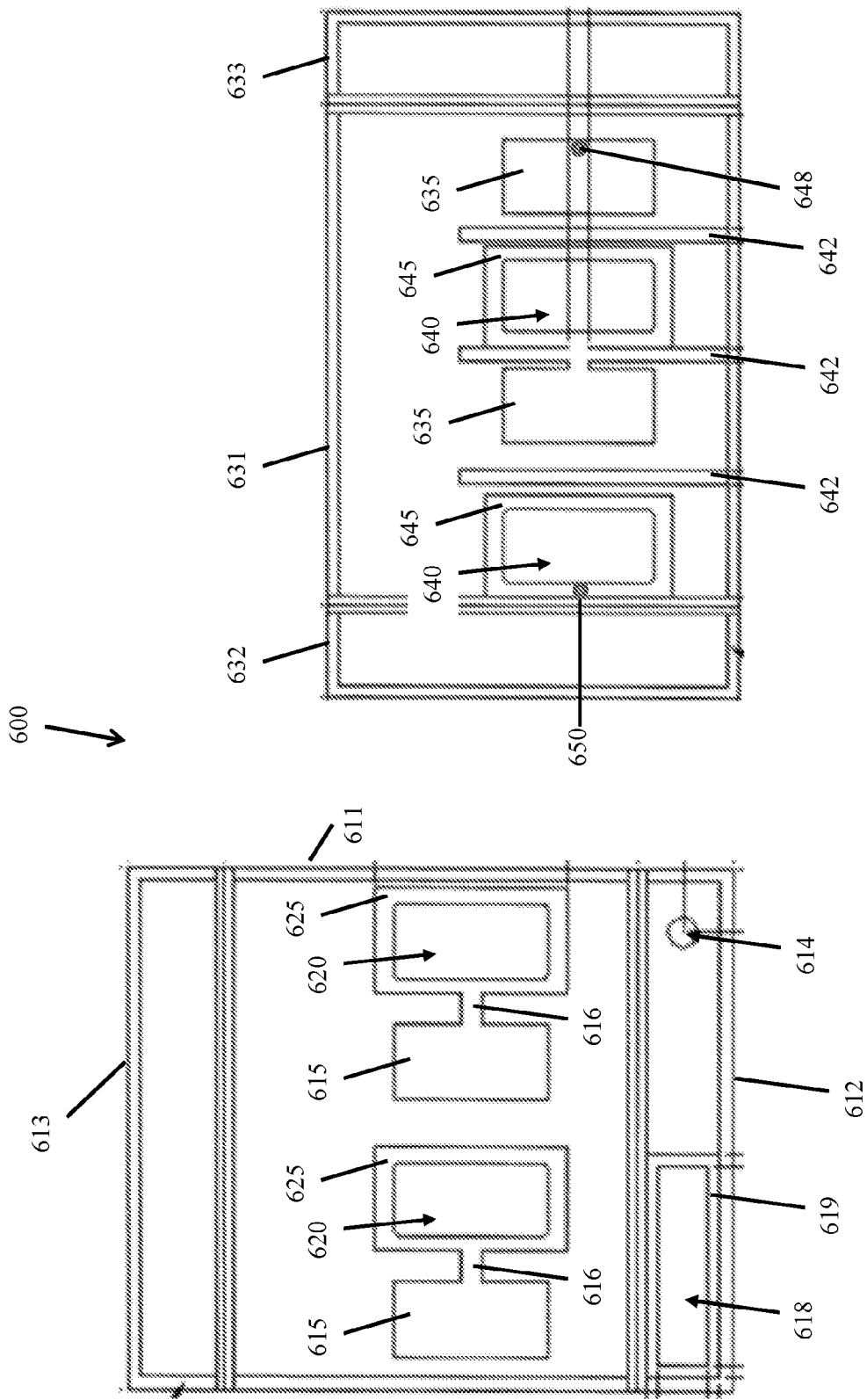

US 9,368,989 B2

BATTERY CHARGER AND FUEL CELL

RELATED APPLICATIONS

This application claims priority to U.S. Provisional Application No. 61/466,423 filed on Mar. 22, 2011, the content of which is hereby incorporated by reference in its entirety into the present application.

FIELD OF THE INVENTION

This invention relates generally to green power generation systems, and more particularly, to portable, green power generation systems for charging rechargeable batteries.

BRIEF DESCRIPTION OF DRAWINGS

Non-limiting and non-exhaustive embodiments of the present invention are described with reference to the following figures, wherein like reference numerals and/or indicia refer to like parts throughout the various views unless otherwise precisely specified.

FIG. 6 is a schematic block diagram of the constituent parts and internal functional components of a fuel cell, in accordance with yet another embodiment of the present invention.

DETAILED DESCRIPTION OF ILLUSTRATED EMBODIMENTS

Figure 1A:
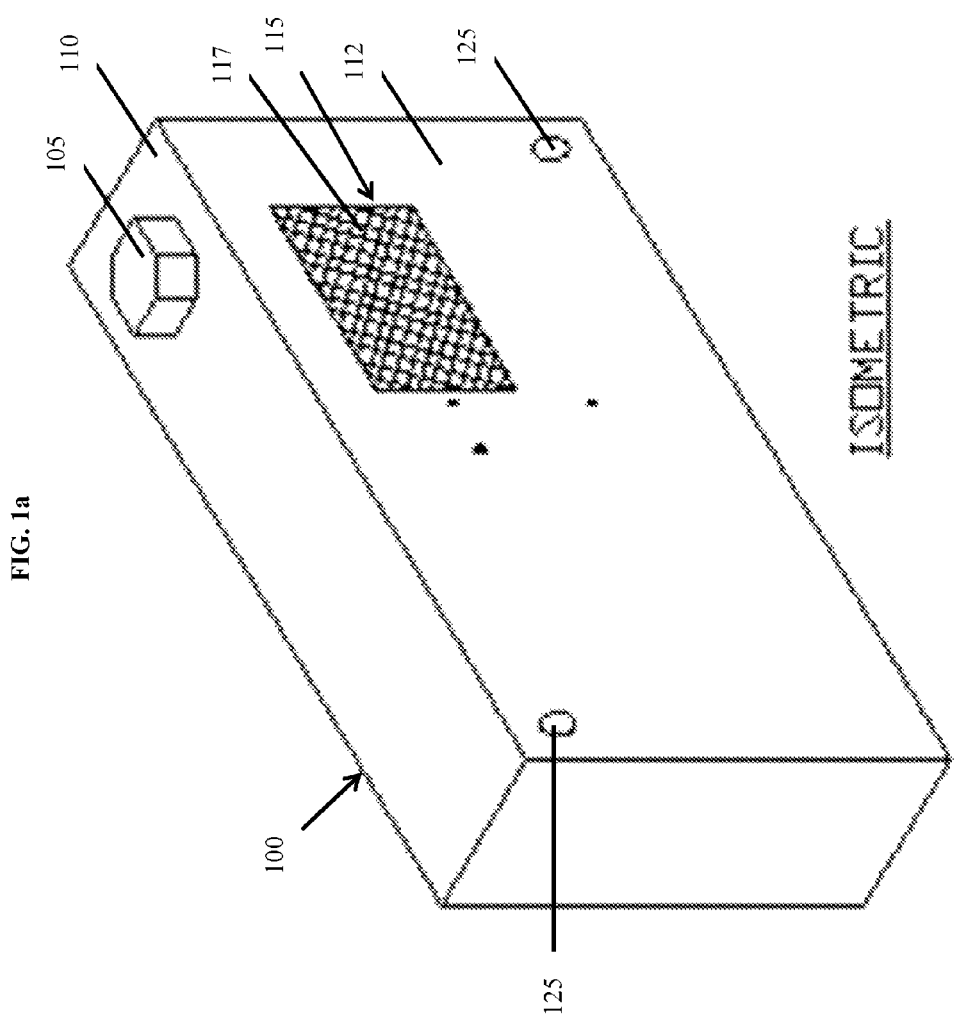
FIG. 1a is a top, front perspective view of the exterior of the back of a personal battery charger fuel cell, in accordance with an embodiment of the present invention.

In accordance with one or more embodiments of the present invention, a new and inventive battery charging fuel cell system design is provided. Specifically, a non-electric, i.e., does not rely on an external supply of electricity, battery charger. In one embodiment of an inventive battery charging system, a personal battery charging fuel cell system includes (i.e., comprises) a fuel cell with a closed internal chamber and at least one magnesium anode and a cathode pair, and 6 eternally accessible, female AA battery positions and that is designed to generate enough power to recharge the 6 AA batteries once saltwater is added to the internal chamber to activate the charger. Each female AA battery position is sized to receive and hold a single AA battery and has a positive and a negative connection, which are electrically connected to the internal chamber via wires to receive the output power generated by the battery charger. In addition, the closed internal chamber has a sealable water inlet (i.e., cap) and a gas output opening covered with a gas-permeable fabric that does not permit water to pass through it and out of the internal chamber. In some embodiments, the sealable water inlet and gas output opening may be one in the same. The system is manufactured with the magnesium cathode and anode in a dry state, which enables the charging device to be stored indefinitely, provided it is kept dry and is not filled with water. The system may also include a flocculent, for example, but not limited to, Alum (Aluminum Sulfate ($Al_2(SO_4)_3$)), either stored dry inside the internal chamber, or added to the internal chamber with or when the saltwater is added. The flocculent acts to encapsulate a magnesium hydroxide (MgOH) byproduct that is generated during the operation of and has a tendency to clog or foul the battery charger and reduce its efficiency after it has operated for a period of time. Other embodiments of the battery charger are contemplated that can be scaled up and/or down in size and with different battery-type connection points to produce different amounts of power and to enable the charging of different types of batteries and/or devices with internal, built-in batteries. For example, instead of the female battery positions that hold batteries, a male charging end can be configured to plug into and charge a rechargeable device, for example, but not limited to, a cell phone battery. In still another embodiment, the system is configured as a fuel cell with positive and negative terminals for connection to devices to provide power.

The empty weight of the battery charger shown in FIGS. 1-5 is about 4.4 ounces and the weight with 6 AA batteries is about 9.7 ounces. The charger can be made from recyclable plastic and can be recycled after being used or the charger refurbished by replacing the anodes. The dimensions of the battery charger shown in FIGS. 1-5 is about 3" high by about 5" long by about 1" deep.

The magnesium anode can be made from, for example, but not limited to, AZ31B magnesium tooling plate. The cathode is an air cathode, which is typically a sheet-like member having opposite surfaces respectively exposed to the atmosphere and to an aqueous electrolyte of the cell, so that when the aqueous electrolyte is in contact with a metal side of the cathode and atmospheric oxygen dissociates while metal of the anode oxidizes to provide an electric current flow through external circuitry connected between the anode and cathode. As noted, the air cathode is permeable to air but substantially waterproof or hydrophobic (i.e., aqueous electrolyte does not seep or leak through the cathode). Currently, an air cathode includes an active carbon side (with or without an added dissociation-promoting catalyst) containing a finely divided hydrophobic polymeric material and incorporating a metal screen as the conductive element. A variety of anode metals can be used including iron, zinc, magnesium, aluminum, alloys of aluminum, etc., with alloys of aluminum and magnesium being considered especially advantageous for particular applications due to low cost, light weight and ability to function as anodes in metal/air batteries using neutral electrolytes, such as sea water or other aqueous saline solutions. Metal/air batteries have an essentially infinite shelf-storage life rendering them very suitable for standby or emergency uses in that the metal-air battery may be activated by addition of an electrolyte. The cathode may be produced using a variety of methods including, but not limited to, those disclosed in the following U.S. Pat. No. 4,885,217, Air Cathodes and Materials Therefor, to Hoge; U.S. Pat. No. 4,906,535, Electrochemical Cathode and Materials Therefor, to Hoge; U.S. Pat. No. 5,032,473, Electrochemical Cathode, to Hoge; U.S. Pat. No. 5,053,375, Electrochemical Cathode and Materials Therefor, to Hoge. The entire content of each of the foregoing U.S. patents is hereby incorporated by reference into the present application.

During operation of embodiments of the battery charging system (see, FIGS. 1-5 and 6-7), a DC power current is generated by the interaction of the saltwater, air, cathode and anode and sent to battery positions via wire connected to the cathode and anode. In the AA embodiments shown in FIGS. 1-7, the operational output of the battery charger is about 1.3 Volts DC (VDC). The battery charger is environmentally friendly as it generates power internally from the interaction of the saltwater, air, cathode and anode, and does not produce any toxic emissions or by products that cannot just be put in the trash. In some embodiments, the battery charger/fuel cell is designed to be disposed of after a single use and/or after the anodes are used up. However, in other embodiments, the battery charger is designed to be refurbished for additional uses by replacing the used anodes. In general, the electrolyte in the charger can be reused several times before it needs to be replaced.

In some embodiments of the battery charger, the ratio of water volume to anode volume is on the order of 13:1. In embodiments of the battery charger, the anode and cathode are spaced apart by approximately ¼-⅜ inches.

FIG. 1a is a top, front perspective view of the exterior of the back of a battery charger fuel cell, in accordance with an embodiment of the present invention. As seen in FIG. 1a, a battery charger 100 is shown as having a substantially rectangular configuration with a cap 105 for and in position in a water fill hole (see FIG. 1b) on a top 110 of the battery charger 100 and a cathode window 115 on a back 112 of the battery charger 100 through which a cathode 117 is seen in position. Two output gas vents 125 are shown in diagonally opposite corners of the back 112 of the battery charger 100.

Figure 1B:
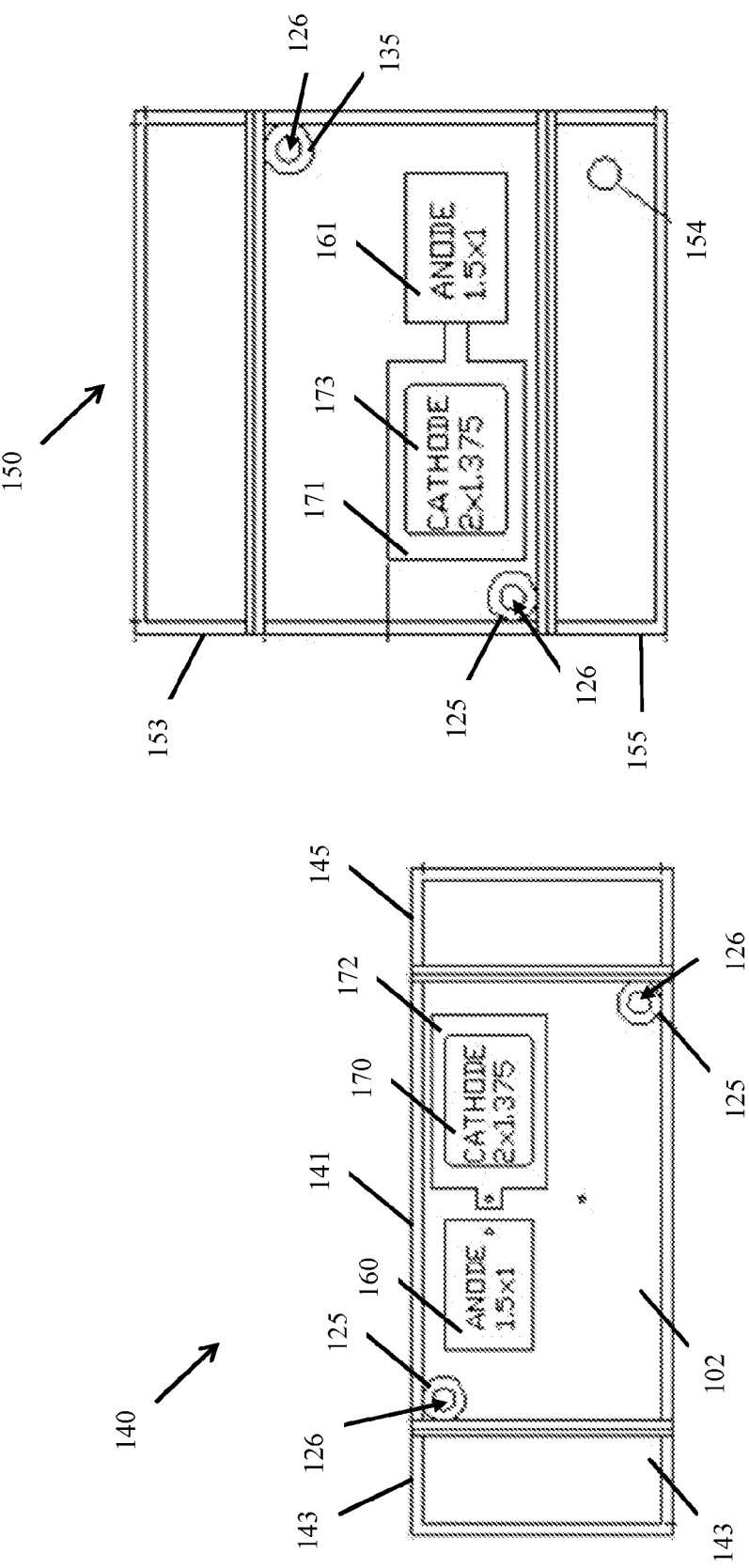
FIG. 1b is a schematic block diagram of the internal functional components of a battery charger fuel cell, in accordance with an embodiment of the present invention.
Figure 9:
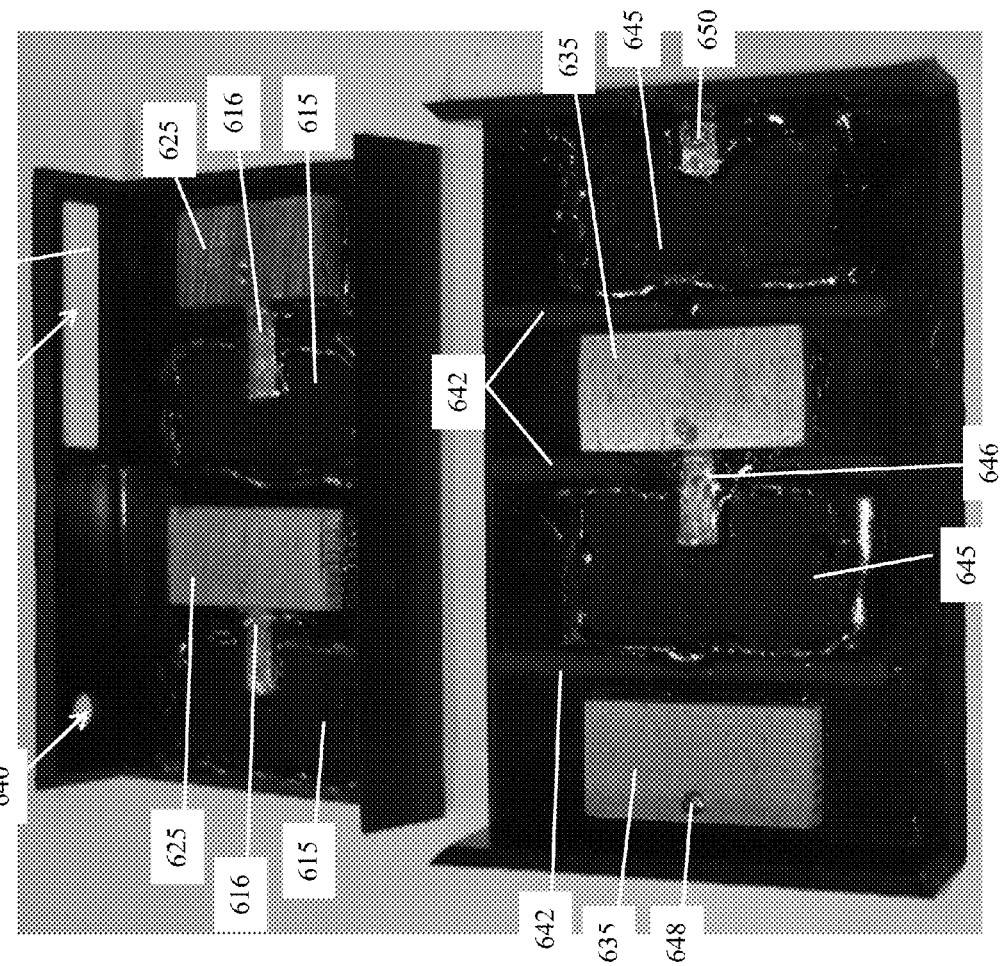
FIG. 9 is an exploded, internal perspective view of the fuel cell of FIG. 8, in accordance with the yet another embodiment of the present invention.

FIG. 1b is a schematic block diagram of the internal functional components of a battery charger fuel cell, in accordance with an embodiment of the present invention. In FIG. 1b, two halves of the battery charger are shown, a front half 140 and a back half 150. The front half 140 includes a front wall 141, a right side wall 145 and a left side wall 145, which are each hinged to an opposite side of the front half 140. Attached to an inside surface 102 of a front wall 141 of the front half 140 are an anode 160 and a cathode 170. The cathode 170 sealingly covers a front cathode window 172, which extends through the front wall 141 and provides aces for air to contact a back side of the cathode 170. A gas permeable fabric patch 126 is shown sealed over each of the output gas vents 125 on an inside surface 102 of the front wall 140. Left side wall 143 and right side wall 145 are flexibly attached to the front wall 140 and fold upwardly to about 90° angles to the front wall 140 (this is best seen in FIG. 9). To enable the walls to fold up and to permit a tight fit between the front half 141 and the back half 150, the edges around and between all walls are chamfered at a 45° angle.

In FIG. 1b, the back half 150 includes a top wall 153 and a bottom wall 155, which are hinged at a top and a bottom of the back half 150, respectively. Attached to an inside surface 152 of a back wall 151 of the back half 150 are a second anode 161 and a second cathode 171. The second cathode 171 sealingly covers a back cathode window 173, which extends through the back wall 151 and provides access for air to contact a back side of the second cathode 171. Another gas permeable fabric patch 135 is shown sealed over each of two back output gas vents 126 on an inside surface 152 of the back wall 152. Top wall 153 and bottom wall 155 are flexibly attached to the back wall 152 and fold upwardly to about 90° angles to the back wall 152 (this is best seen in FIG. 9).

Figure 2:
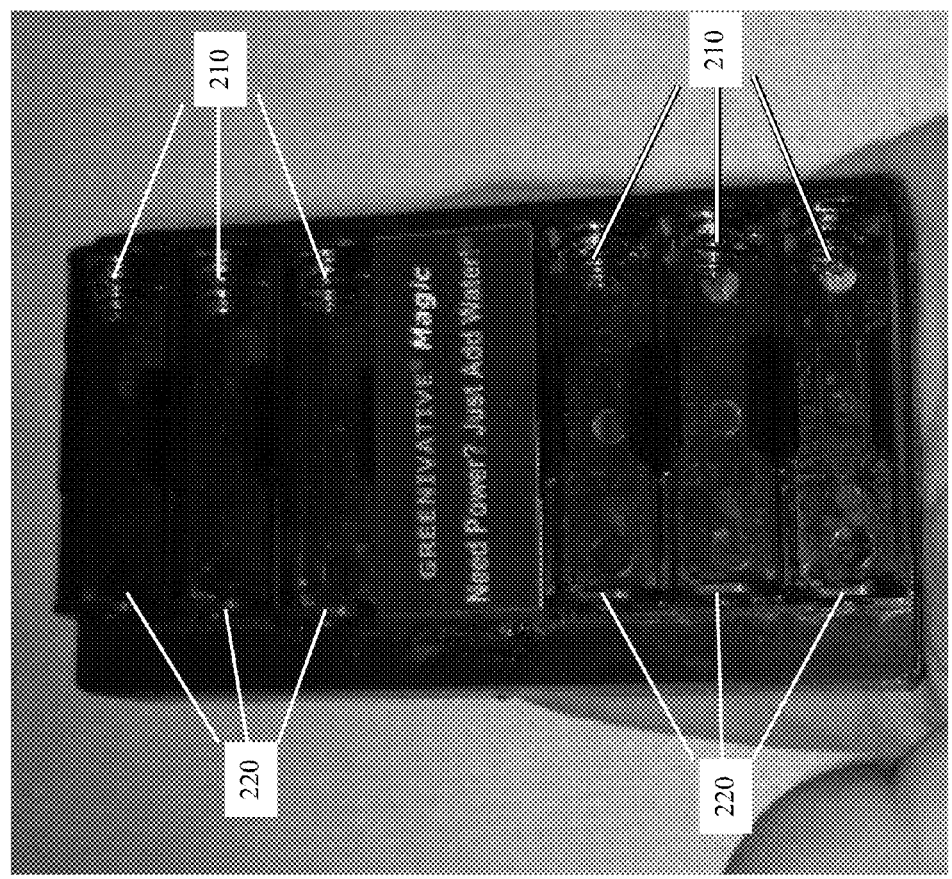
FIG. 2 is a front perspective view of a battery charger without batteries installed for charging, in accordance with an embodiment of the present invention.

FIG. 2 is a front perspective view of a battery charger without batteries installed for charging, in accordance with an embodiment of the present invention. In FIG. 2, negative battery end terminals 210 are seen on the right side of the device as metal spring terminals and the positive battery end terminals 220 are seen on the left side of the device as metal pads with detents extending outwardly from about the middle of each metal pad and toward the negative battery end terminals. The empty weight of the battery charger 100 is about 4.4 ounces.

Figure 3:
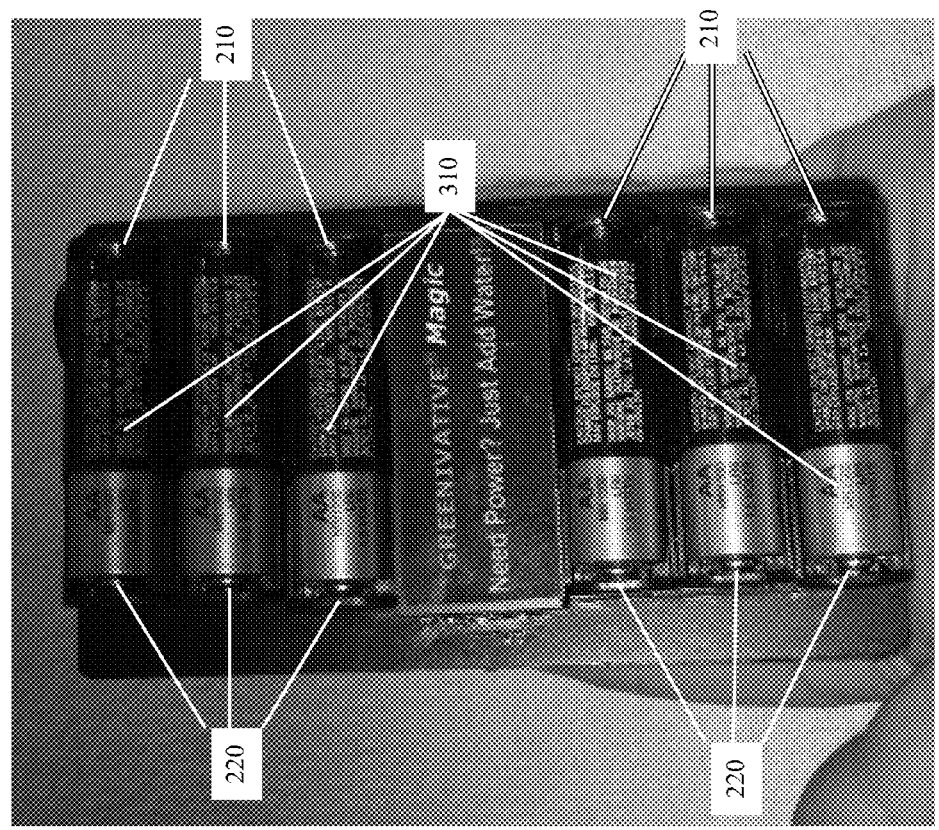
FIG. 3 is a front perspective view of the battery charger of FIG. 2 with batteries installed for charging, in accordance with an embodiment of the present invention.

FIG. 3 is a front perspective view of the battery charger of FIG. 2 with batteries installed for charging, in accordance with an embodiment of the present invention. In FIG. 3, the battery charger 100 has six batteries 310 in position for charging. While the battery charger 100 is shown with six batteries 310 in position for charging, any number from one to six can be charged at one time. In general, the battery charger 100 can recharge 1 to 6 depleted 1.5V rechargeable AA batteries in about 30 to 45 minutes. A depleted battery is used here to mean a battery that has been reduced to about 20% of its full charge. Fully discharged batteries, i.e., reduced to about 0% of its full charge, can also be recharged, but the amount of time needed to completely recharge a fully discharged battery is about 5 to 6 hours. The weight of the battery charger 100 when it is filled with 6 AA batteries is about 9.7 ounces.

Figure 4A:
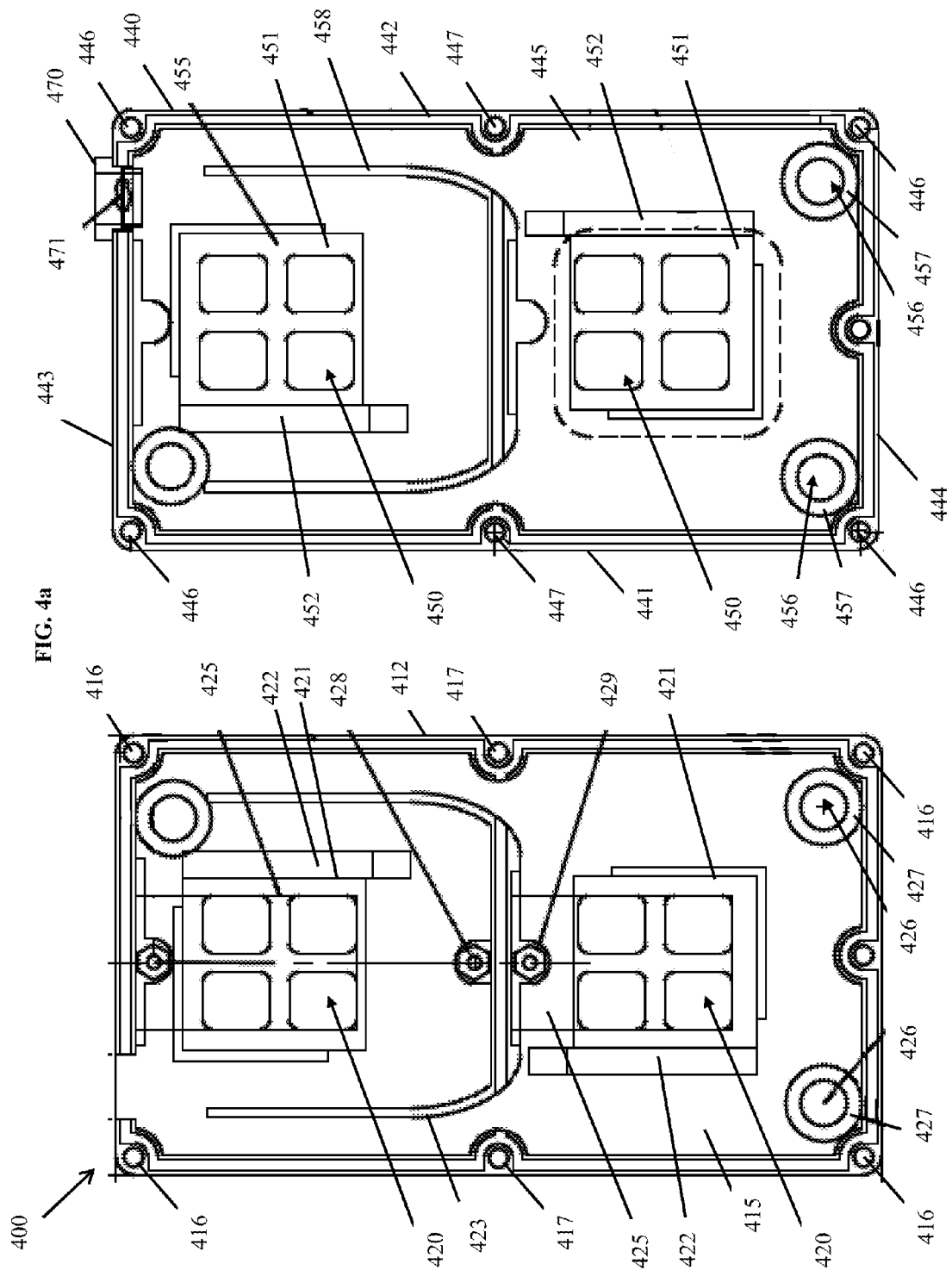
FIG. 4a is a schematic block diagram of the internal functional components of a battery charger, in accordance with another embodiment of the present invention.

FIG. 4a is a schematic block diagram of the internal functional components of a battery charger, in accordance with another embodiment of the present invention. In FIG. 4a, an inside of a left half 410 and an inside of a right half 440 of a personal battery charger 400 are shown with all internal components installed. The left half 410 includes a left side 411, a right side 412, a top side 413, a bottom side 414, and a back wall 415. The sides 411, 412, 413, 414 are affixed at right angles around a periphery of the left half 410 and connected to each other to form a shell for the left half 410. The top side 413 has half of a fill opening 402 defined adjacent a left end of the top side 413. A threaded or smooth corner opening 415 is formed in each corner at a junction of the sides 411, 412, 413, 414 and a threaded or smooth side opening 419 is formed in a middle of the left side 411 and the right sider 412. If threaded, then screws can be used to fasten the two halves together and, if smooth, then nuts and bolts can be used to fasten the two halves together. Two four pane cathode windows 420 are formed in the back wall 415 and anodes 425, one each, are affixed to the back wall 415 and above one of the four pane cathode windows 420. In general, each anode is a piece of magnesium with a length of about 1.45", a width of about 0.875" and a thickness of about 0.25" and a volume of about 0.32 cubic inches ($in^3$). A first cathode 421 is sealingly affixed over a top one of cathode windows 420 and the cathodes 421 are gas-permeable and waterproof. A second cathode 421 is sealingly affixed over a bottom one of the cathode windows 420. A substantially "U"-shaped wall 423 is affixed to the back wall 415 with an open end of the "U"-shaped wall 423 facing upward toward the top side 413. Further in FIG. 4a, three gas vent openings 426 are formed adjacent three corners of the back wall 415 and each is sealed with a gas-permeable, waterproof fabric 427. A positive threaded terminal 428 extended through the back wall 415 and a pair of nuts 431 threaded on to the positive terminal 428 on either side of and locked against the back wall 415. The positive terminal 428 is connected to the first cathode.

Figure 4C:
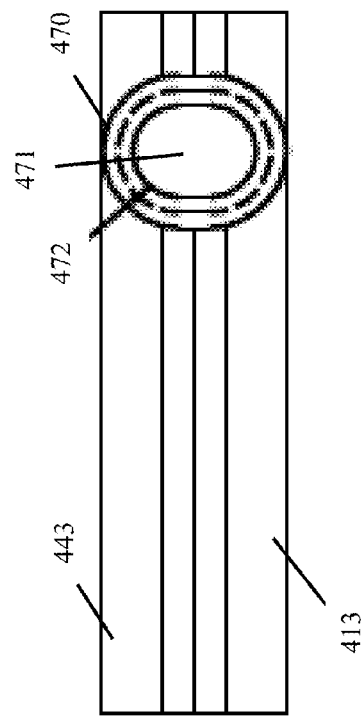
FIG. 4c is a top view of the assembled battery charger of FIG. 4b, in accordance with another embodiment of the present invention.
Figure 4B:
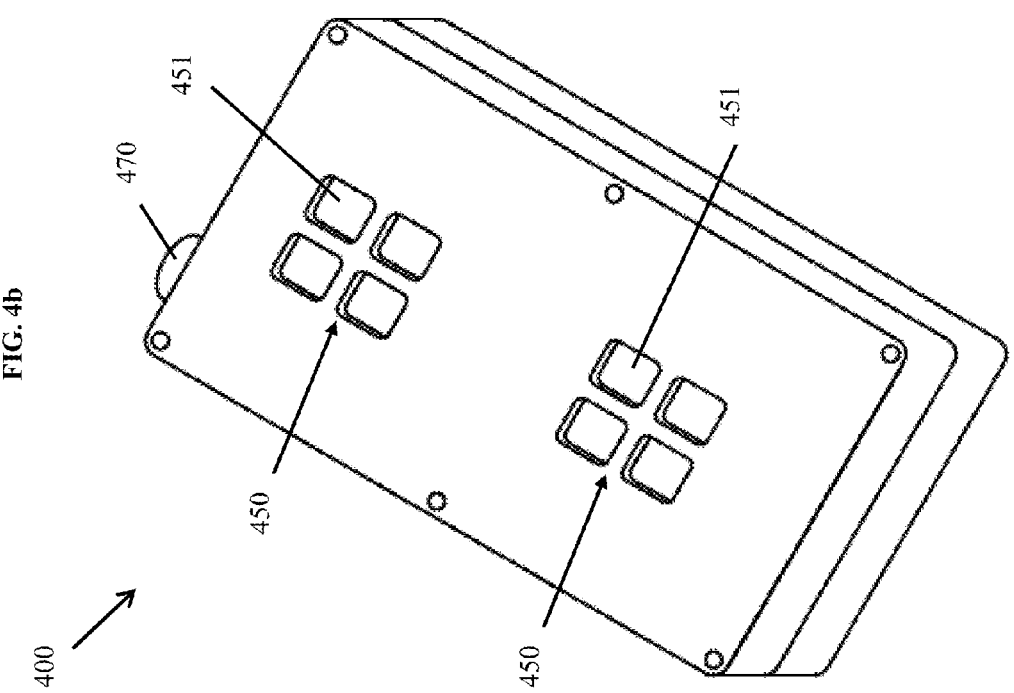
FIG. 4b is a bottom, front perspective view of the battery charger of FIG. 4a, in accordance with another embodiment of the present invention.

FIG. 4b is a bottom, front perspective view of the assembled battery charger 400 of FIG. 4a. As seen in FIG. 4a, a front side 480 of the front wall 445 has two, four panel cathode windows 450 through which a back side of cathodes 451 are visible and are open to air. In FIG. 4b, the right half 440 includes a right side 441, a left side 442, a top side 443, a bottom side 444, and a back wall 445. The sides 441, 442, 443, 444 are affixed at right angles around a periphery of the right half 440 and connected to each other to form a shell for the right half 440. The top side 443 has half of a fill opening 402 defined adjacent a right end of the top side 443. A threaded corner opening 445 is formed in each corner at a junction of the sides 441, 442, 443, 444 and a threaded side opening 449 is formed in a middle of the left side 441 and the right side 442. Two four pane cathode windows 450 are formed in the back wall 455 and are affixed to the back wall 445 and above one of the four pane cathode windows 450. A first cathode 451 is sealingly affixed over a top one of cathode windows 450 and the cathodes 451 are gas-permeable and waterproof. A second cathode 451 is sealingly affixed over a bottom one of the cathode windows 450. A substantially "U"-shaped wall 458 is affixed to the back wall 445 with an open end of the wall 458 facing upward toward the top side 443. Further in FIG. 4a, three gas vent openings 456 are formed adjacent three corners of the back wall 445 and each is sealed with a gas-permeable, waterproof fabric 447. A positive threaded terminal 458 extended through the back wall 445 and a pair of nuts 431 threaded on to the positive terminal 458 on either side of and locked against the back wall 445. The positive terminal 458 is connected to the first cathode. The anodes and cathodes can be affixed to the front and back walls in the embodiment shown in FIG. 4a using an adhesive and/or glue which forms a waterproof seal, especially around the edges of each cathode.

FIG. 4b is a bottom, front perspective view of the personal battery charger of FIG. 4a, in accordance with another embodiment of the present invention.

FIG. 4c is a top view of the assembled battery charger 400 of FIG. 4b. In FIG. 4c, the water cap 470 has an open center channel 472 across which is affixed a gas-permeable and water proof fabric 471.

Figure 5B:
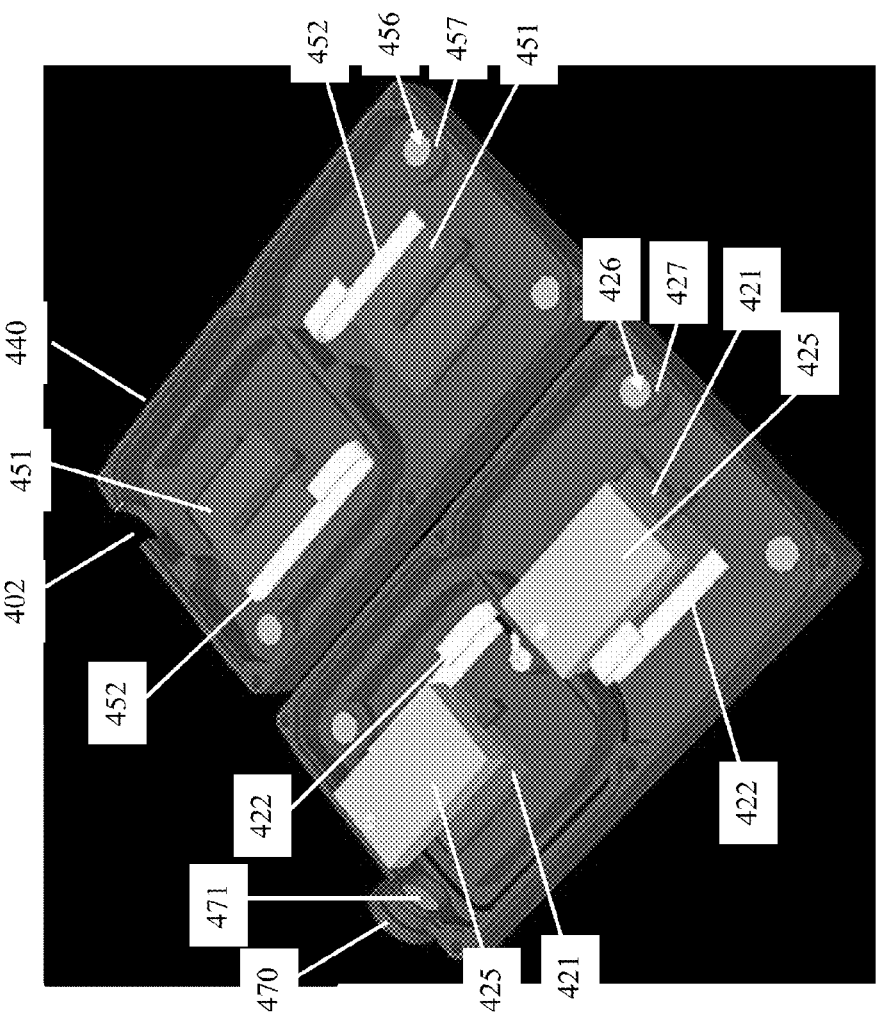
FIG. 5b is a top perspective internal view of the battery charger as depicted in FIGS. 4a-c, in accordance with another embodiment of the present invention.
Figure 5A:
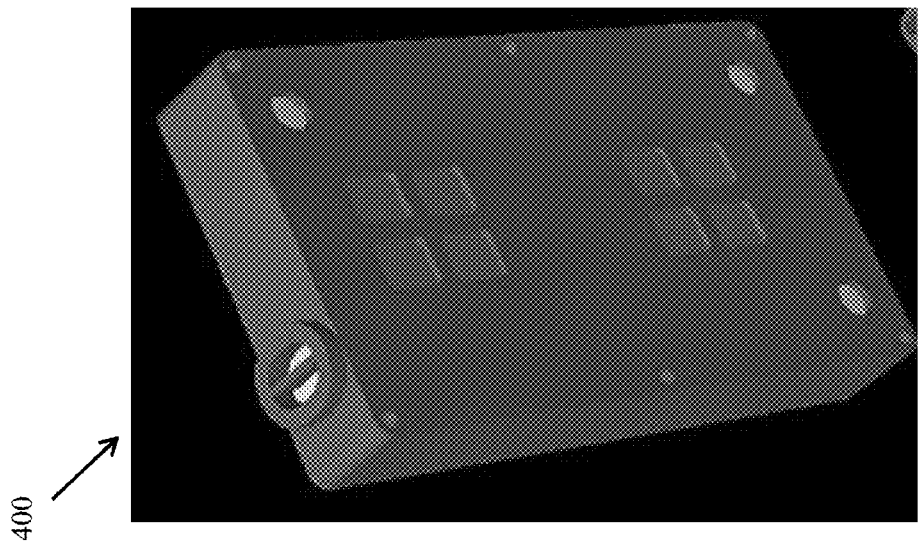
FIG. 5a is a front perspective view and a top perspective internal view of the personal battery charger as depicted in FIG. 6, in accordance with another embodiment of the present invention.

FIG. 5a is a front perspective view of the battery charger as depicted in FIGS. 4a-c, in accordance with another embodiment of the present invention. In FIG. 5a, a three-dimensional graphical rendering of the battery charger 400 of FIGS. 4a-c.

FIG. 5b is a top perspective internal view of the battery charger as depicted in FIGS. 4a-c, in accordance with another embodiment of the present invention. In FIG. 5b, three-dimensional graphical rendering of the inner components the battery charger 400 of FIGS. 4a-c.

FIG. 6 is a schematic block diagram of the constituent parts and internal functional components of a fuel cell, in accordance with yet another embodiment of the present invention. In FIG. 6, a fuel cell 600 includes a front half 610 and a back half 630 and can be attached to a belt and be worn by a person. The front half 610 includes a front wall 611, a top wall 612 flexibly affixed to a first longitudinal edge of the front wall 611, a bottom wall 613 flexibly affixed to a second longitudinal edge that is opposite of the first longitudinal edge of the front wall 611, and two anodes 615 where each is electrically connected to one of two adjacent cathodes 625 by a metal connection 616. In general, there is approximately a ⅛" 45 degree) (°) chamfer around the edges of each of the front wall 611, top wall 612 and bottom wall 613. This permits the top and bottom walls 612, 613 to be folded upward at a 90° from the front wall 611 to assemble the fuel cell 600. Each anode 615 and each cathode 625 is permanently affixed to an inside surface of the front wall 611. The front half 610 also includes two cathode windows 620 defined in the front wall 611 and the cathodes 625 are each affixed over and seal one of the cathode windows 620. The top wall 612 includes a circular water fill hole 614 defined there through and a substantially rectangular gas vent opening 618 that is sealingly covered with a gas-permeable waterproof fabric 619.

In FIG. 6 the back half 630 includes a back wall 631, a left side wall 632 flexibly affixed to a first lateral edge of the back wall 631, a right side wall 633 flexibly affixed to a second lateral edge that is opposite of the first lateral edge of the back wall 631, and another two anodes 635 where the anode 635 and the cathode 645 in a middle of the back wall 631 are electrically connected by a metal connection 616. In general, there is approximately a ⅛" 45° chamfer around the edges of each of the back wall 631, left side wall 632 and right side wall 633. This permits the left and right side walls 632, 633 to be folded upward at a 90° from the back wall 631 to assemble the fuel cell 600. Each anode 635 and each cathode 645 is permanently affixed to an inside surface of the back wall 631. The back half 630 also includes two cathode windows 640 defined in the back wall 631 and the cathodes 645 are each affixed over and seal one of the cathode windows 640. The back wall 631 includes at least two internal walls 642 rigidly affixed at a 90° to the back wall 631 with one affixed between the single unconnected cathode 645 and the anode cathode pair in the middle of the back wall 631 and the other affixed between the single unconnected anode 635 and the anode cathode pair in the middle of the back wall 631. Optionally, a third internal wall can be affixed between the anode cathode pair in the middle of the back wall 631. Each internal wall extends laterally from an inside edge of the chamfer around one longitudinal side of the back wall 631 and about two-thirds of the way across the back wall 631 to end slightly past the end of each anode 635 and each cathode 645 affixed to the back wall 631. The outer cathode 645 is also connected to a threaded positive terminal 650 which, generally, extends through the cathode 645 and the back wall 631 and is affixed to the back wall 631 using two nuts threaded onto the positive terminal 650 and tightened against an outside surface of the back wall 631. Similarly, the outer anode 635 is also connected to a threaded negative terminal 648 which, generally, extends through the anode 635 and the back wall 631 and is affixed to the back wall 631 using two nuts threaded onto the negative terminal 648 and tightened against an outside surface of the back wall 631. The anodes and cathodes can be affixed to the front and back walls in the embodiment shown in FIG. 6 using an adhesive and/or glue which forms a waterproof seal, especially around the edges of each cathode. When assembled, the open area above the internal walls is positioned below the top wall 612 to permit any gas produced in each cell defined by the internal walls 642 to have access to the gas vent 618.

In FIG. 6, when the front and back halves 610, 630 are joined together they are permanently affixed to form a watertight seal around all edges. The only opening is the water fill hole 614, which has a water cap (not shown, but similar to that described above in relation to FIGS. 4*a-c* below in relation to FIGS. 12-18.

Figure 7:
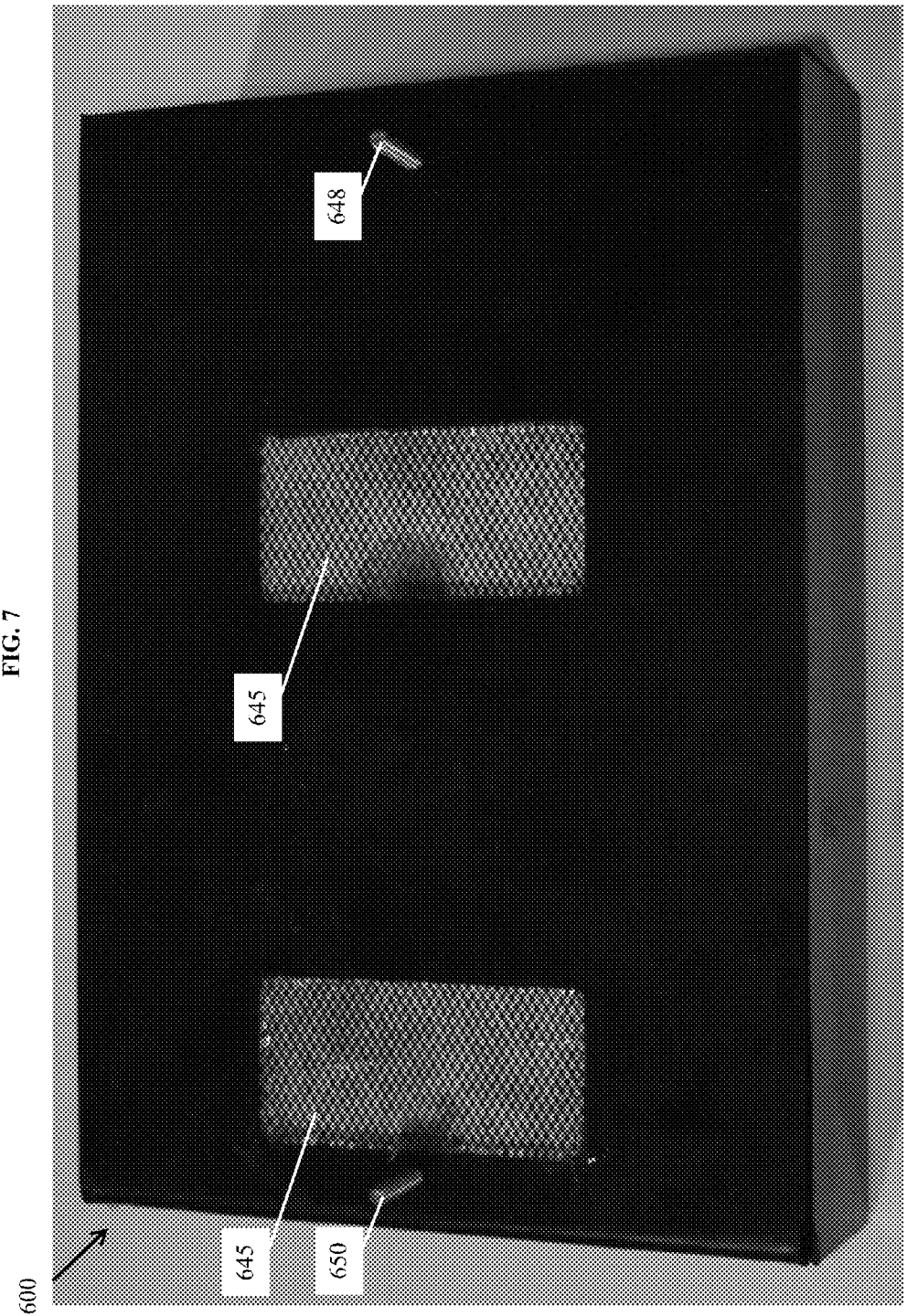
FIG. 7 is a front view of a fuel cell detailed in FIG. 6, in accordance with the yet another embodiment of the present invention.

FIG. 7 is a front view of a fuel cell detailed in FIG. 6, in accordance with the yet another embodiment of the present invention. In FIG. 7, positive terminal 650 and negative terminal 648 are seen extending from and the two cathodes 645 are visible through the cathode windows 640 formed in the back wall 631 of the fuel cell 600.

Figure 8:
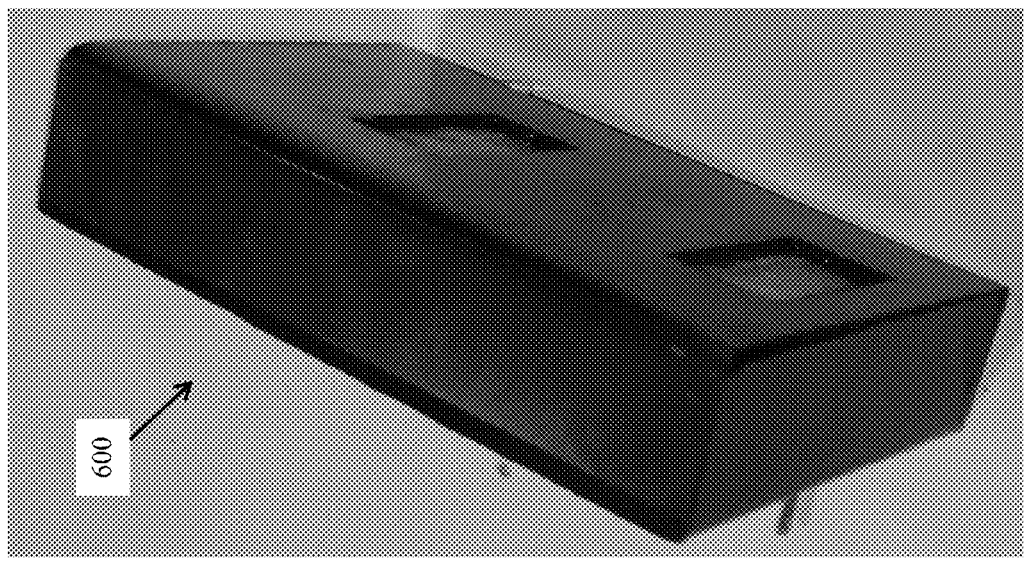
FIG. 8 is a top, front perspective view of the fuel cell of FIG. 7, in accordance with the yet another embodiment of the present invention.

FIG. 8 is a top, front perspective view of the fuel cell of FIG. 7, in accordance with the yet another embodiment of the present invention.

FIG. 9 is an exploded, internal perspective view of the fuel cell of FIG. 8, in accordance with the yet another embodiment of the present invention.

Figure 10:
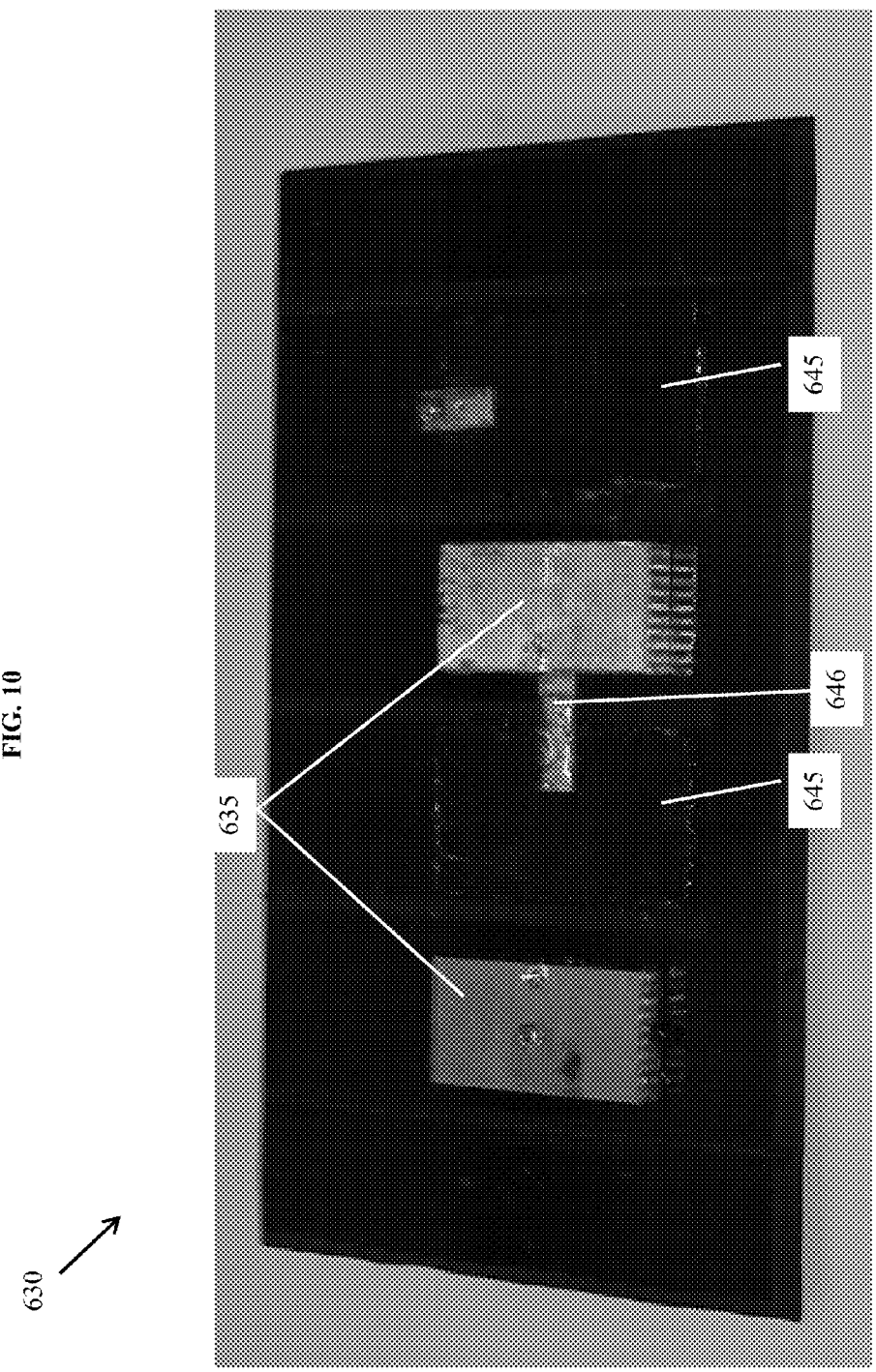
FIG. 10 is a top perspective view of a partially assembled Part B of the fuel cell of FIG. 8, in accordance with the yet another embodiment of the present invention.

FIG. 10 is a top perspective view of a partially assembled Part B of the fuel cell of FIG. 8, in accordance with the yet another embodiment of the present invention.

Figure 11:
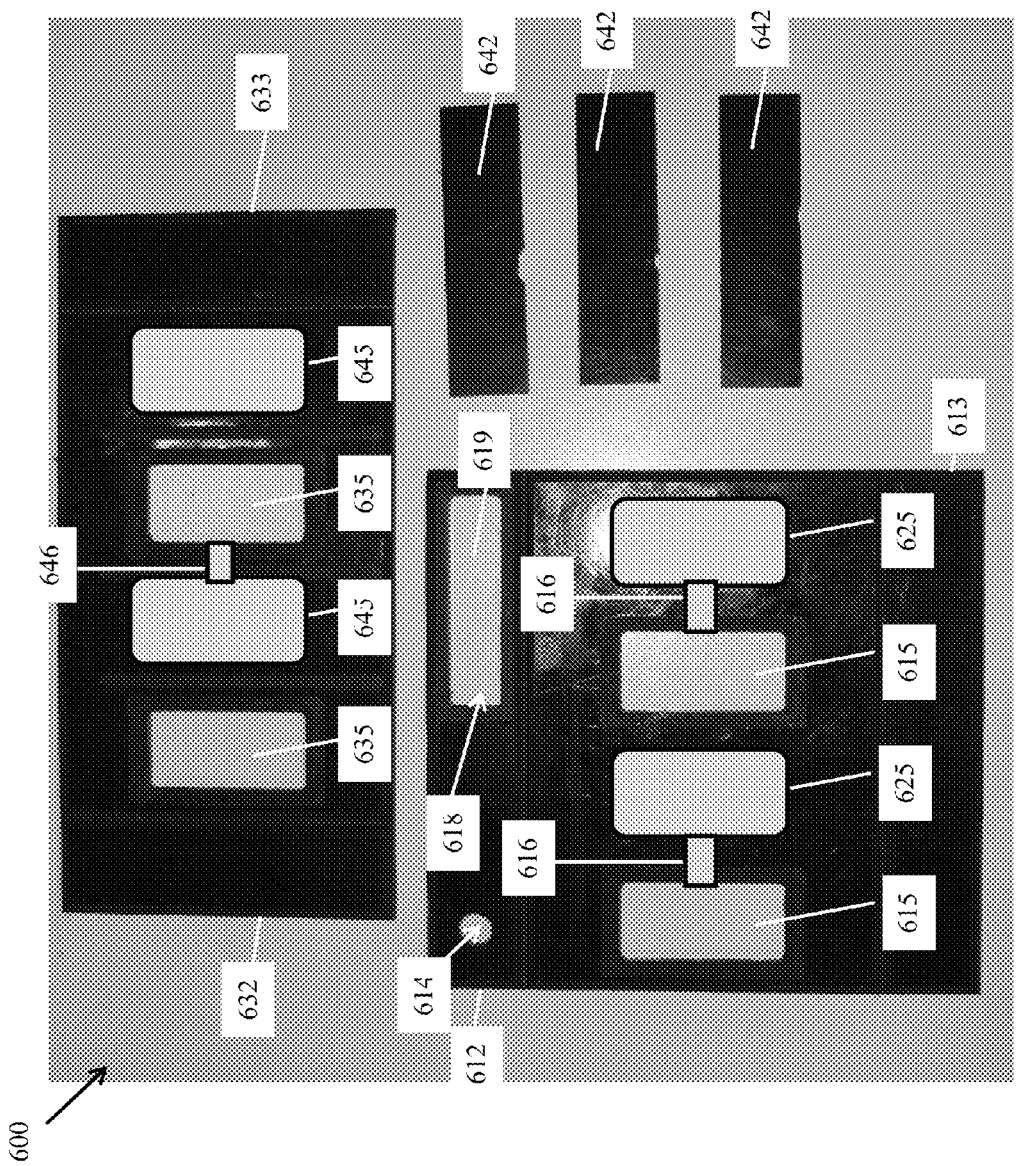
FIG. 11 is a top, exploded view of the plastic housing and internal walls of the fuel cell of FIG. 8, in accordance with the yet another embodiment of the present invention.

FIG. 11 is a top, exploded view of the plastic housing and internal walls of the fuel cell of FIG. 8, in accordance with the yet another embodiment of the present invention.

Figure 12:
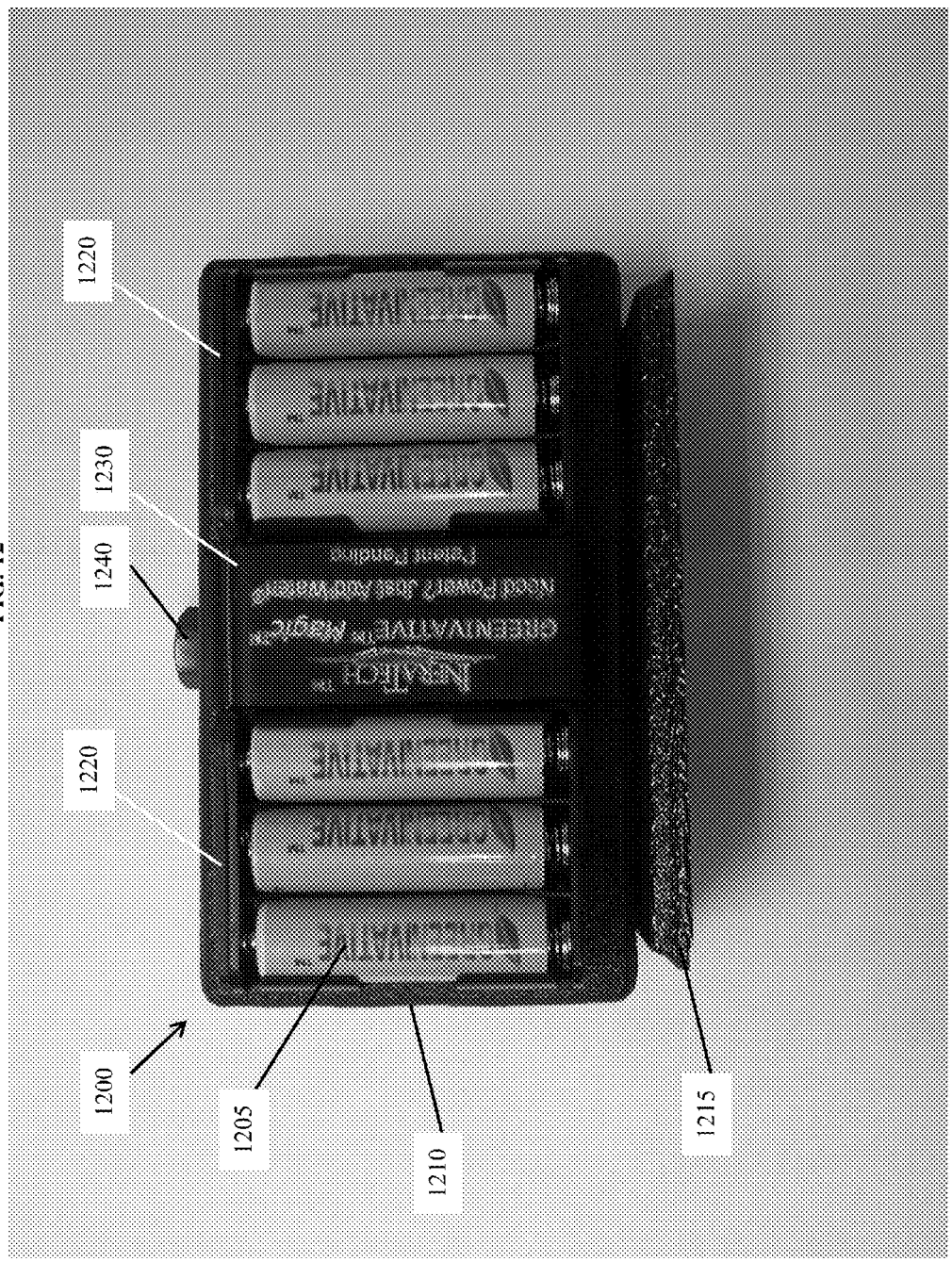
FIG. 12 is a back view of a battery charger, in accordance with still another embodiment of the present invention.

FIG. 12 is a back view of a battery charger, in accordance with still another embodiment of the present invention. In FIG. 12, a battery charger 1200 includes a body portion 1210, a base portion 1215, two three-position battery holders 1220, a shield 1230 positioned between the two three-position battery holders 1220 and covering and protecting positive and negative terminals and wiring connecting the two three-position battery holders 1220 to the positive and negative terminals, and a water cap 1240 located on a top wall of the battery charger 1200. Each three-position holder is wired in parallel and the two three-position holders are also wired in parallel. The entire body portion 1210 is watertight with the exception of a water fill hole (not shown) that is located on the top wall of the battery charger 1200, but is made watertight by inserting the removeable water cap 1240 into the water fill hole. The water cap 1240 is generally a threaded bolt with a square, hexagonal, or any shape that aids in the manual removal and fitting of the water cap 1240 in the water fill hole. In general, an "O"-ring is fitted over a shaft of the water cap 1240 and positioned against the bottom of the top of the water cap 1240 (see FIG. 18). The battery charger 1200 may be outfitted with up to 6 batteries 1205, and in this embodiment, 6 AA batteries. While the embodiment in FIG. 12 is directed to a battery charger 1200 for 6 AA batteries, other embodiments are contemplated for AAA, C, D, 9V, cell phone, PDA, wet cell (e.g., motorcycle, automotive and deep cycle marine), etc. batteries, but are not explicitly shown here for ease of illustration. Likewise, the number of battery positions can be more and less than the 6 shown in FIG. 12 and all of the positions can be in a single holder. The fuel cell of the present invention can be used without the battery charger to, but is not limited to, directly power maritime equipment such as life jacket lights, marker buoy lights, navigation lights, life raft lights and all other manner of maritime equipment requiring long-term reliable power.

Figure 13:
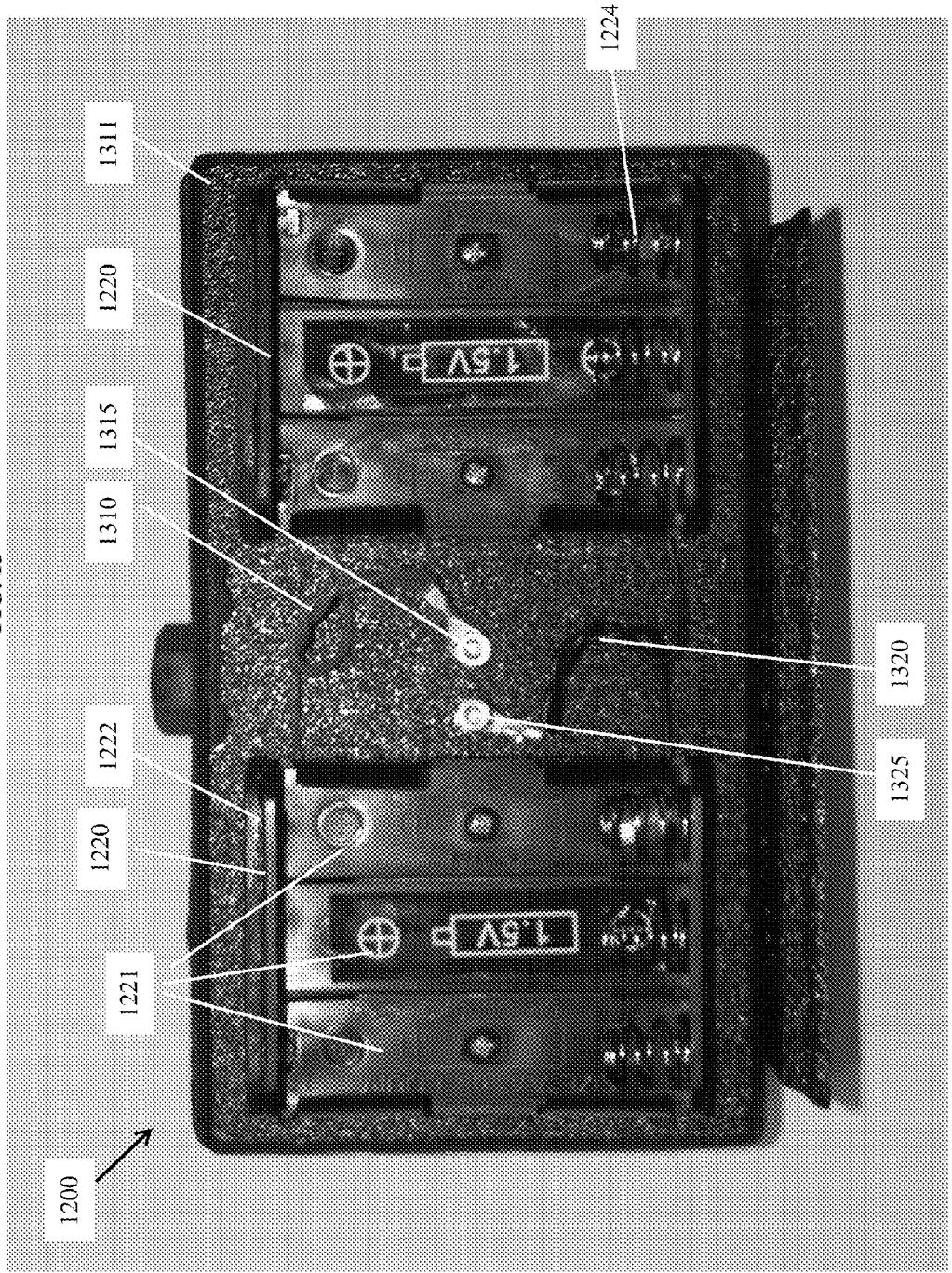
FIG. 13 is a back view of the battery charger of FIG. 12 without a cover over positive and negative terminals, in accordance with the still another embodiment of the present invention.

FIG. 13 is a back view of the battery charger of FIG. 12 without a cover over positive and negative terminals, in accordance with the still another embodiment of the present invention. In FIG. 13, the batteries 1205 and shield 1230 have been removed to more clearly show the details of the battery charger 1200. Specifically, each battery holder 1220 is shown to include 3 positions 1221 for AA batteries and the two battery holders 1220 are affixed to a battery plate 1311. In addition, each battery holder 1220 has a positive button-type contact 1222 located at a top of each battery position 1221 and a negative spring-type contact 1224 located at a bottom of each battery position 1221. Also now visible is a positive wire pair 1310 connected to the positive terminal 1315 and the positive button-type contacts 1222 located at the top end of each battery holder 1220, and a negative wire pair 1320 connected to the positive terminal 1325 and the negative spring-type contacts 1224 located at the bottom end of each battery holder 1220. The positive terminal 1315 and the negative terminal 1325 are connected to the inside of the body 1210 and provide the output of the power produced in the body 1210 of the battery charger 1200.

Figure 14:
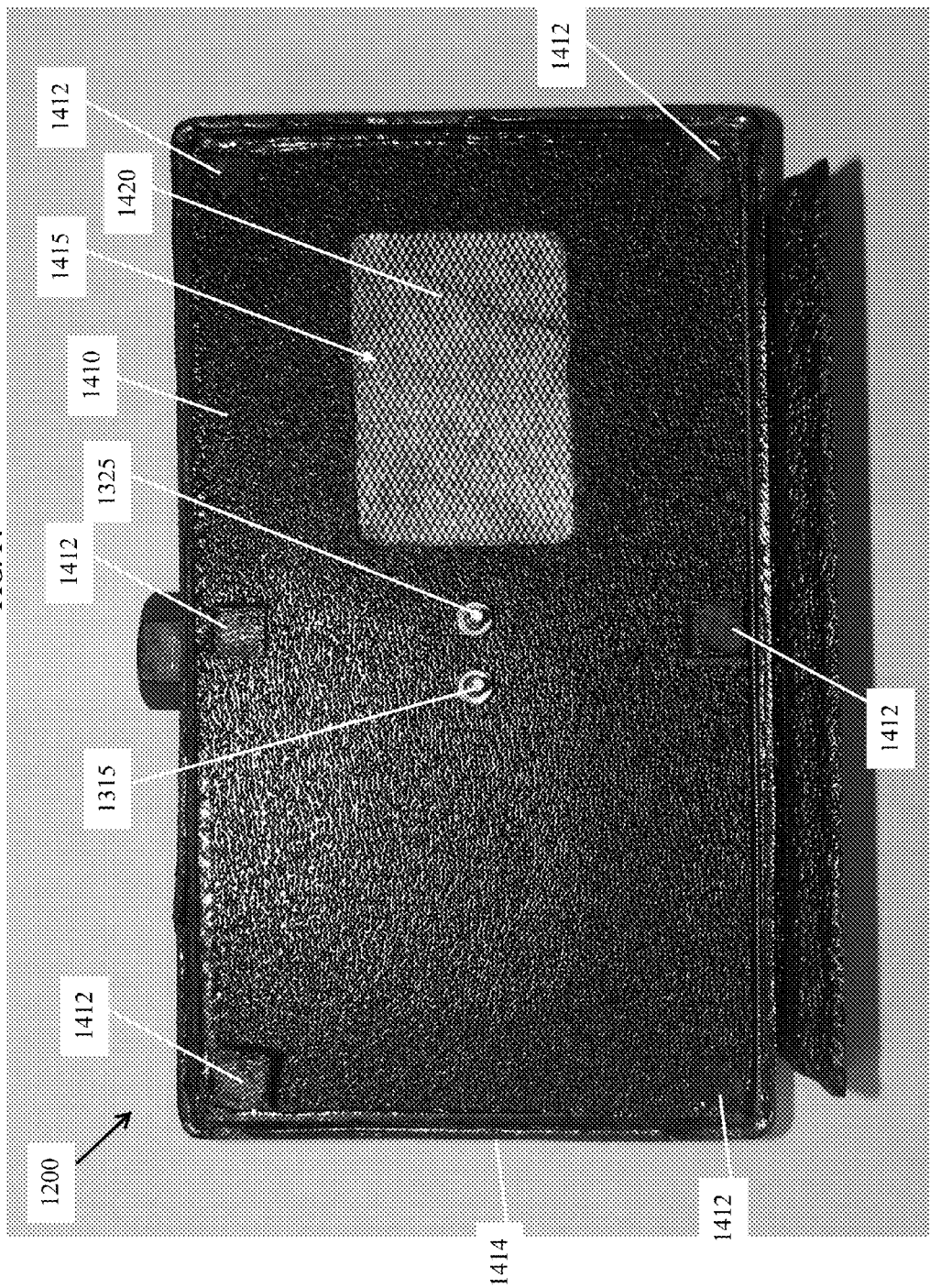
FIG. 14 is a back view of the battery charger of FIG. 12 without the battery holders, in accordance with the still another embodiment of the present invention.

FIG. 14 is a back view of the battery charger of FIG. 12 without the battery holders, in accordance with the still another embodiment of the present invention. In FIG. 14, the battery plate 1311 and its components has been removed to show a back wall 1410 of the battery charger 1200 in which a cathode window 1415 is shown formed in a right half of the back wall 1410 and in which a back side of a cathode 1420 is visible. As seen in FIG. 14, the back wall 1410 is sealed to a front portion 1414 of the body 1210 to ensure the body 1210 is watertight. Also shown are the positive terminal 1315 and the negative terminal 1325, which are being held in place against the back wall 1410 by two side by side nuts. A spacer 1412 is shown at each corner and at a top and bottom in a middle of the longitudinal length of the back wall 1410 to provide spacing between the back wall 1410 and the battery plate 1311 and its components to permit air to circulate to and from the back of the cathode 1420, which is required for operation.

Figure 15:
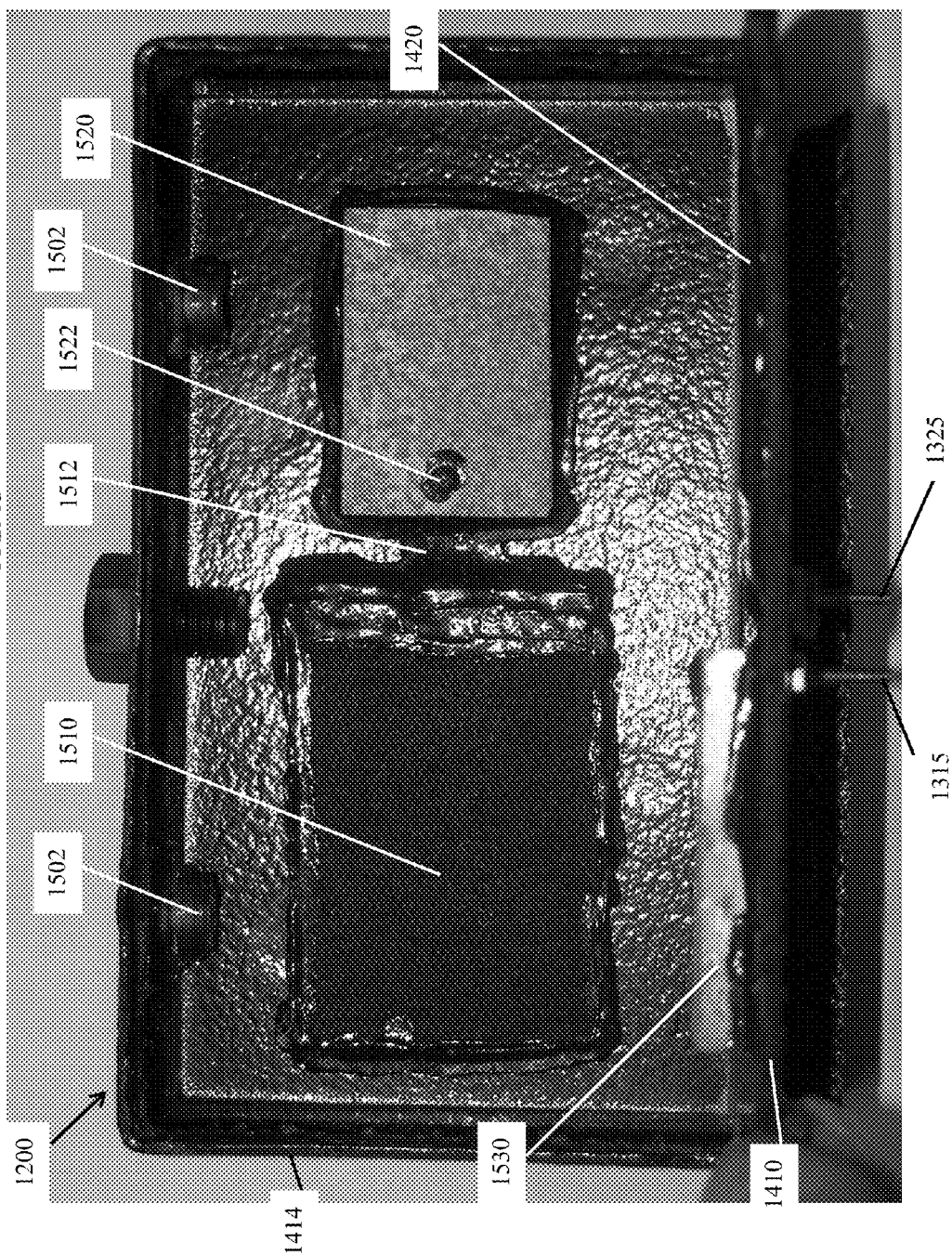
FIG. 15 is a back perspective view of the battery charger of FIG. 12 with back wall folded down to show the inner configuration of the anodes and cathodes, in accordance with the still another embodiment of the present invention.

FIG. 15 is a back perspective view of the battery charger of FIG. 12 with back wall folded down to show the inner configuration of the anodes and cathodes, in accordance with the still another embodiment of the present invention. In FIG. 15, the back wall 1410 is shown with the adhesive sealant removed from around the left, top and right sides of the back wall 1410 and the front portion 1414 and folded down to show the inside of the body 1210. At the top of the front portion 1414 and on opposite sides of the water cap 1240 are two gas vents 1502, to permit the gas produced in the body 1210 to escape, but prevent any water from leaking out. In the embodiment shown in FIG. 15, each gas vent 1502 is a one-way check valve or pressure release valve that includes a base having a circular disk shape with at least one channel formed there through and which is affixed in and in fluid communication with an open circular bottom portion of a top of the gas vent. The top of each gas vent further includes a smaller circular disk extending from a top of and coaxially aligned with the top of the gas vent and the smaller circular disk has a channel there through that is in fluid communication with an inside of the open circular bottom portion. Between the base and the top is disposed a valve mechanism to permit gas to escape out of the body 1210 once a threshold pressure level is reached in the body 1210, but prevent any water from leaking out if the body 1210 was on its side or inverted. Likewise, the one-way check valve prevents the back flow of either gas or liquid into the body 1210. The check value for this design uses a modified version of a check valve, Model Serial Number SCV01092, and which can be obtained from Valve Plastics, Inc. of Fort Collins, Colo. The gas vent can be of any similar construction and/or a simple vent opening that is covered with a gas-permeable and waterproof fabric. Both the cathode 1510 and the anode 1520 are affixed to the back side of the front portion 1414 using adhesive and/or glue.

Figure 16:
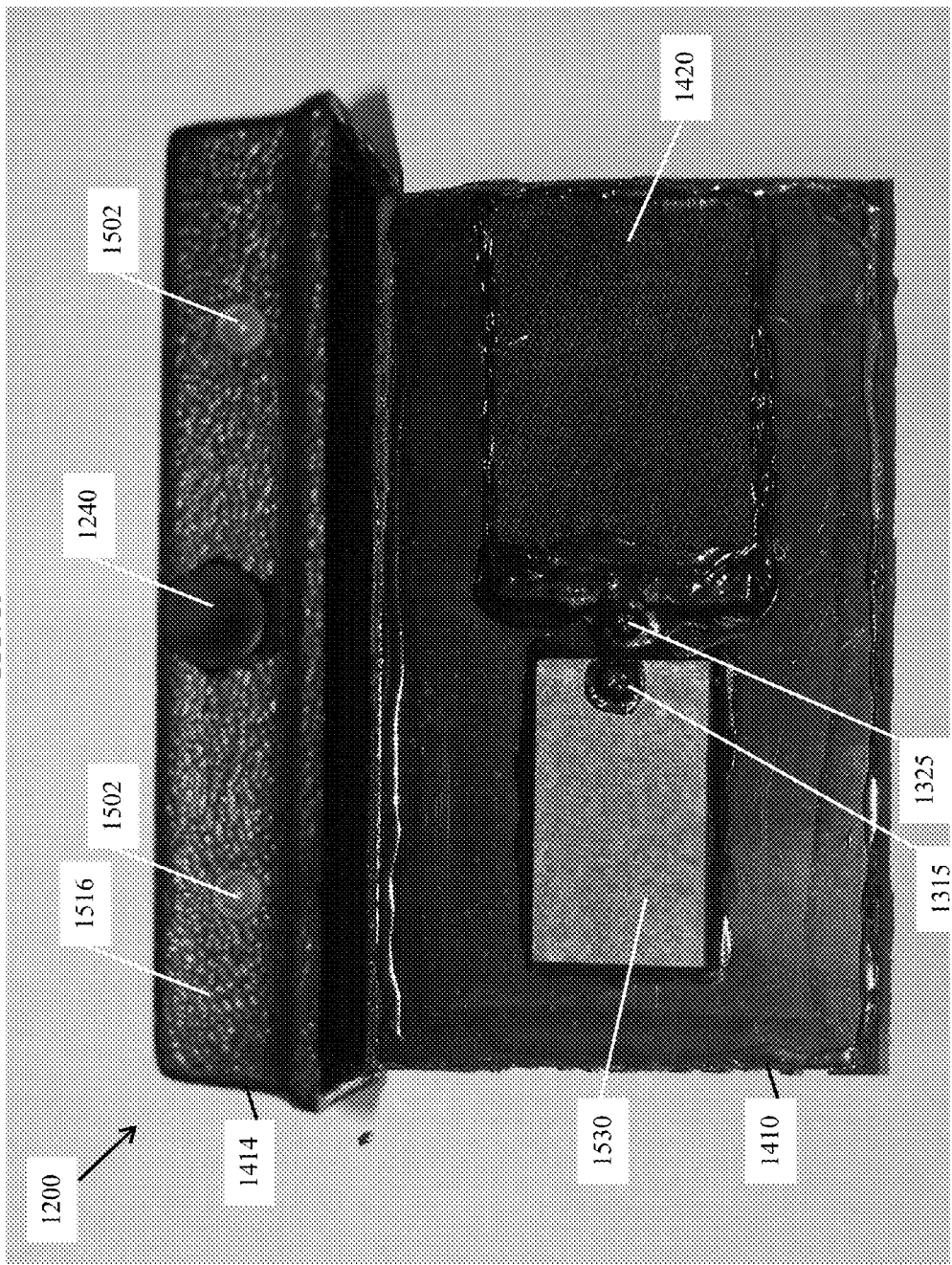
FIG. 16 is a top view of the battery charger of FIG. 15 showing the top of front portion and positioning of an anode and a cathode on a back side of the folded down back wall, in accordance with the still another embodiment of the present invention.

FIG. 16 is a top view of the battery charger of FIG. 15 showing the top of front portion and positioning of an anode and a cathode on a back side of the folded down back wall, in accordance with the still another embodiment of the present invention. In FIG. 16, a top of each smaller circular disk of gas vent 1502 is seen positioned in a top wall 1516 of the front portion 1414 on opposite sides of water cap 1240. Another anode 1530 is seen rigidly affixed to the back side of back wall 1410 by a glue and/or adhesive and by the negative terminal 1315, which extends through the anode 1530 and the back wall 1410 and the negative terminal 1315 is affixed to the anode with adhesive and/or glue and to the front side of the back wall 1410 with two nuts. The cathode 1420 is likewise seen rigidly affixed to the back side of back wall 1410 by a glue and/or adhesive and by the positive terminal 1325, which extends through the cathode 1420 and the back wall 1410 and the positive terminal 1325 is affixed to the cathode with adhesive and/or glue and to the front side of the back wall 1410 with two nuts.

While the embodiment shown in FIGS. 12-16 are not designed to have replaceable anodes, in other refurbishable and/or replenishable embodiments the battery charger has a back wall that is removably and sealingly attached to the front portion 1414 of the body 1210 and the anode is replaceable. This can be accomplished by only affixing the anode to the back wall using the negative terminal without adhesive or glue and/or using a removable cage, net or other like retaining element to restrain the anode 1530. A similar removable cage, net or other like retaining element can be used to keep the anode 1520 in position. The cathodes 1510 and 1420 can be permanently affixed to the back wall 1410 and to the front portion 1414.

In yet another refurbishable and/or replenishable embodiment (not shown), the body is sealed as in FIGS. 12-16, replaceable anode components include an anode and a larger wall piece attached to the anode and that is sealingly and removably attached to the body 1210 in an anode opening defined in the back wall 1410 and front portion 1414 using, for example, but not limited to, a screw, a nut and bolt, a spring clip, a pressure clip, etc. To ensure the body 1210 remains watertight, a rubber and/or other waterproof seal is affixed between an overlap between the anode opening and an outside perimeter portion of the wall piece in the replaceable anode component. This rubber and/or waterproof seal can be a separate piece, affixed to the wall piece, and/or affixed to the overlapped portion of the wall.

Figure 17:
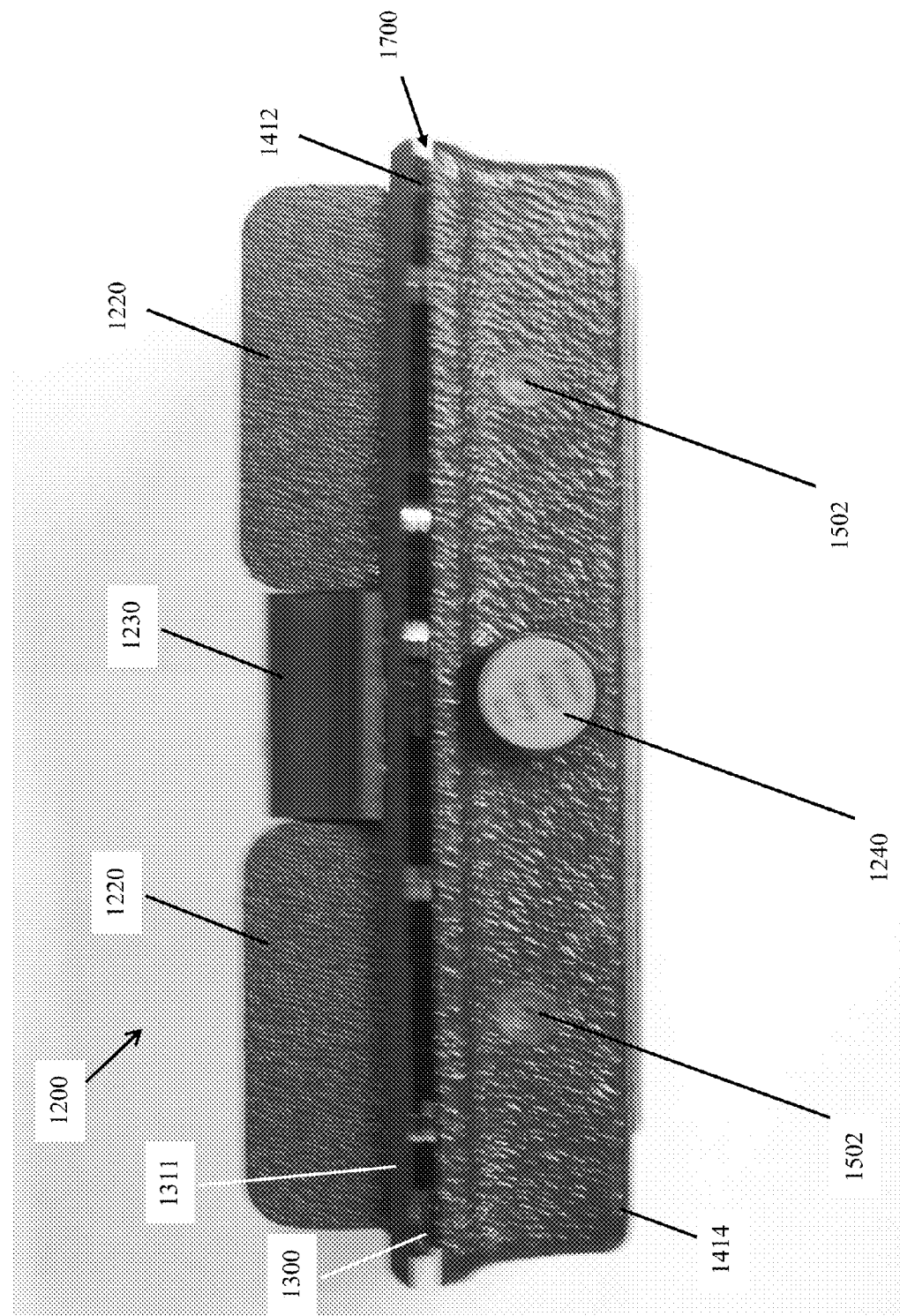
FIG. 17 is a side view of the battery charger of FIG. 12, in accordance with the still another embodiment of the present invention.

FIG. 17 is a top view of the battery charger of FIG. 12, in accordance with the still another embodiment of the present invention. In FIG. 17, a space 1700 is seen running between back wall 1410 of body 1210 and the battery plate 1311. The spacing is required to permit air flow to a back side of cathode 1420 through the cathode window 1415 in the back wall 1410.

Figure 18:
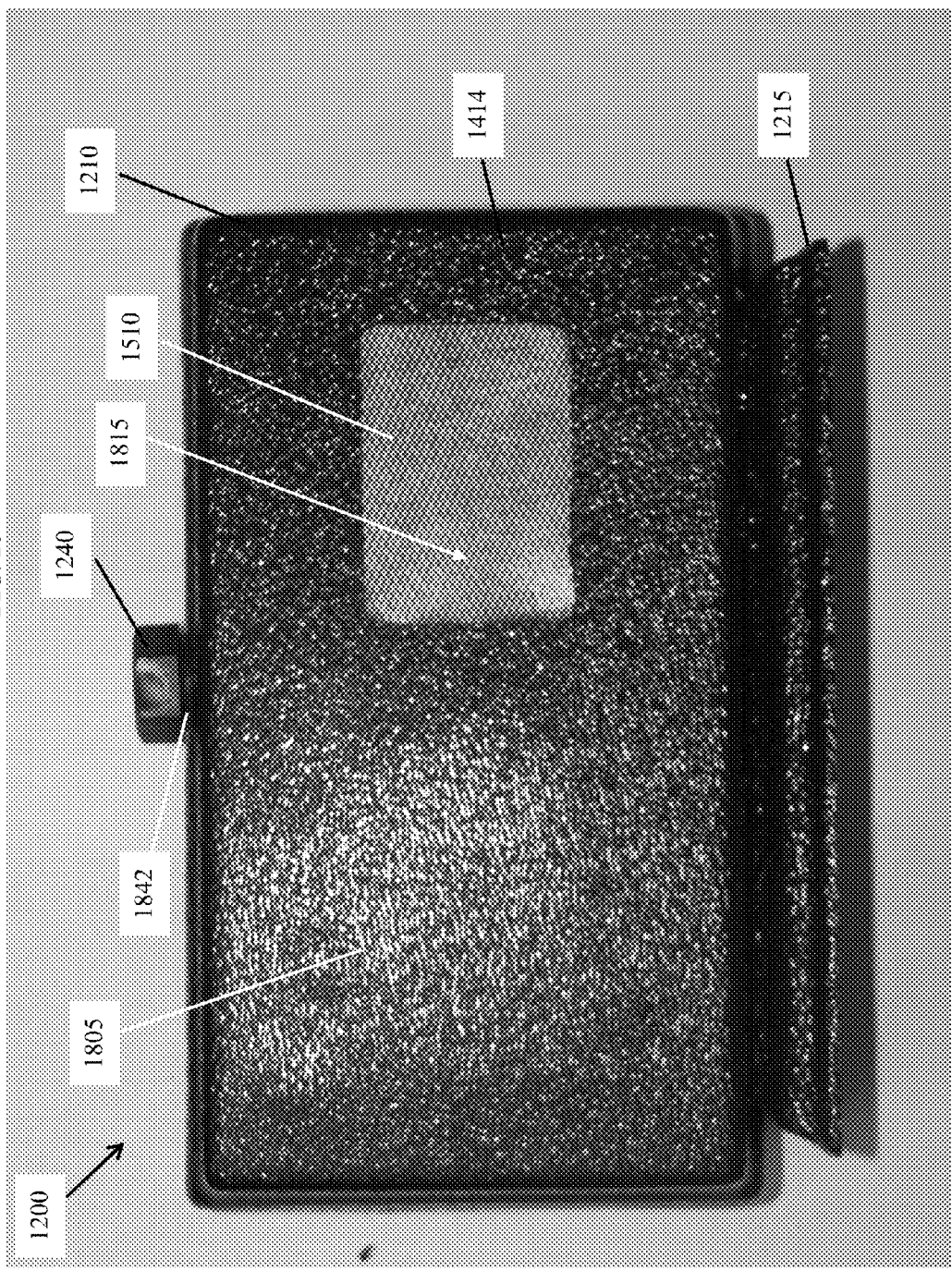
FIG. 18 is a front view of the battery charger of FIG. 12, in accordance with the still another embodiment of the present invention.
Figure 19:
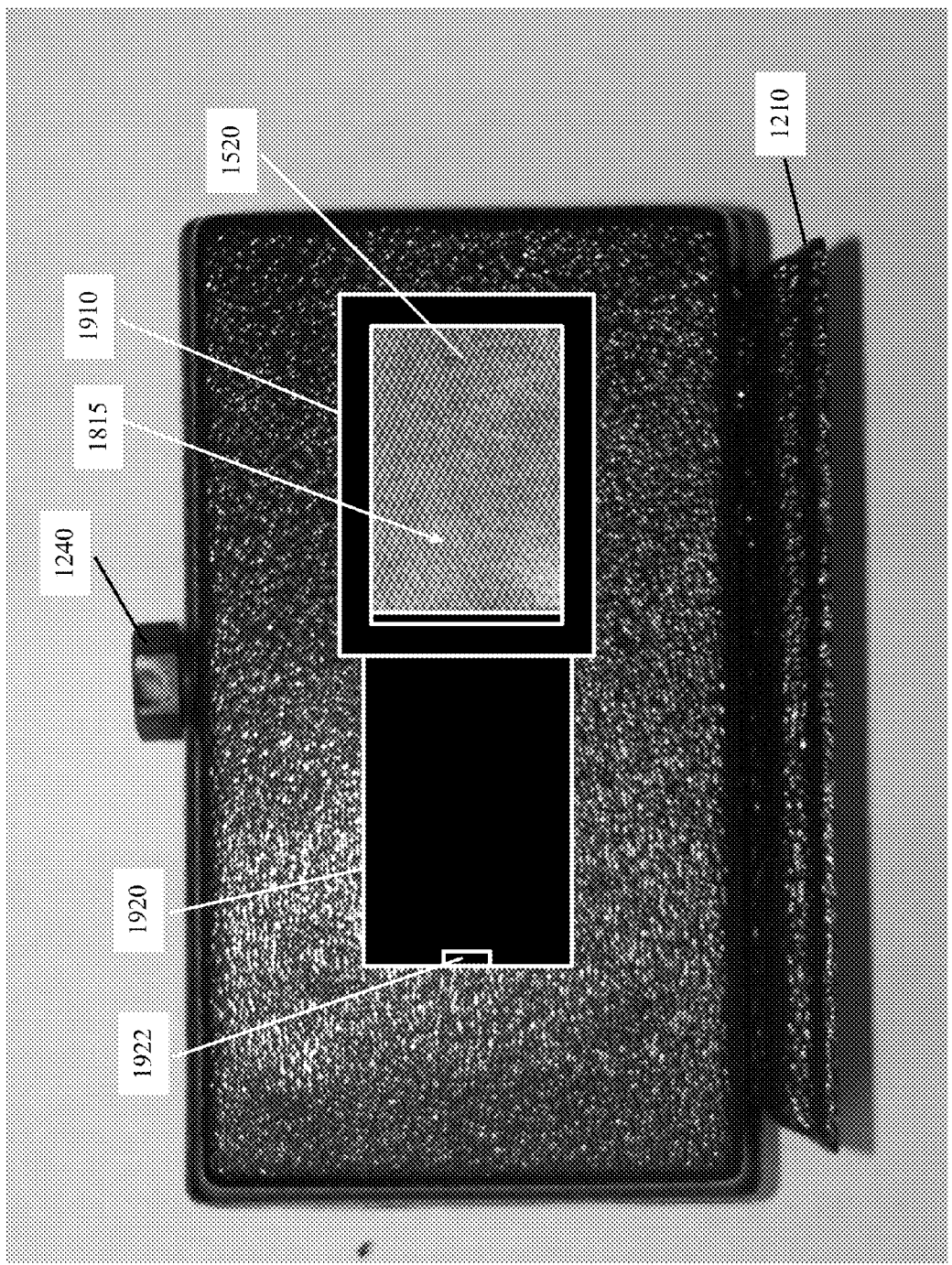
FIG. 19 is a front view of the battery charger of FIG. 12 with a sealable sliding window cover positioned over a cathode window on a front of the battery charger where the sliding window is slidable over the front of the battery charger, in accordance with still yet another embodiment of the present invention.

FIG. 18 is a front view of the battery charger of FIG. 12, in accordance with the still another embodiment of the present invention. In FIG. 18, another cathode window 1815 is located in a front wall 1805 of the front portion 1414 and the back side of the cathode 1510 is seen through the cathode window 1815. An "O"-ring 1842 is seen between water cap 1240 and the top of the battery charger FIG. 19 is a front view of the battery charger of FIG. 12 with a sealable sliding window cover positioned over a cathode window on a front of the battery charger where the sliding window is slidable over the front of the battery charger, in accordance with still yet another embodiment of the present invention. In FIG. 19, a sliding window 1920 and frame 1910 are positioned over the cathode window 1415 and cathode 1420 to permit the opening and closing of the sliding window 1920 to cover the cathode window 1415 and cathode 1420 to stop the flow of air to the cathode 1420, which in turn stops the battery charger from generating and outputting power. Sliding window 1920 includes a handle/stop portion 1922, which can be used to open and close the sliding window 1920, and a bottom surface that forms a generally air-tight seal with the back wall 1410 when it is in the closed position, i.e., when it is completely within the frame 1910 and over the cathode window 1420. This may be accomplished by having the sliding window 1920 be tightly held against the back wall 1410 and/or providing an additional sealing layer of air-tight material on the bottom of the sliding window 1920 and/or on the back wall 1410 under the frame 1910. In general frame 1910 includes slots along the long and short sides into which the sliding window 1920 is slidingly engaged.

Figure 20:
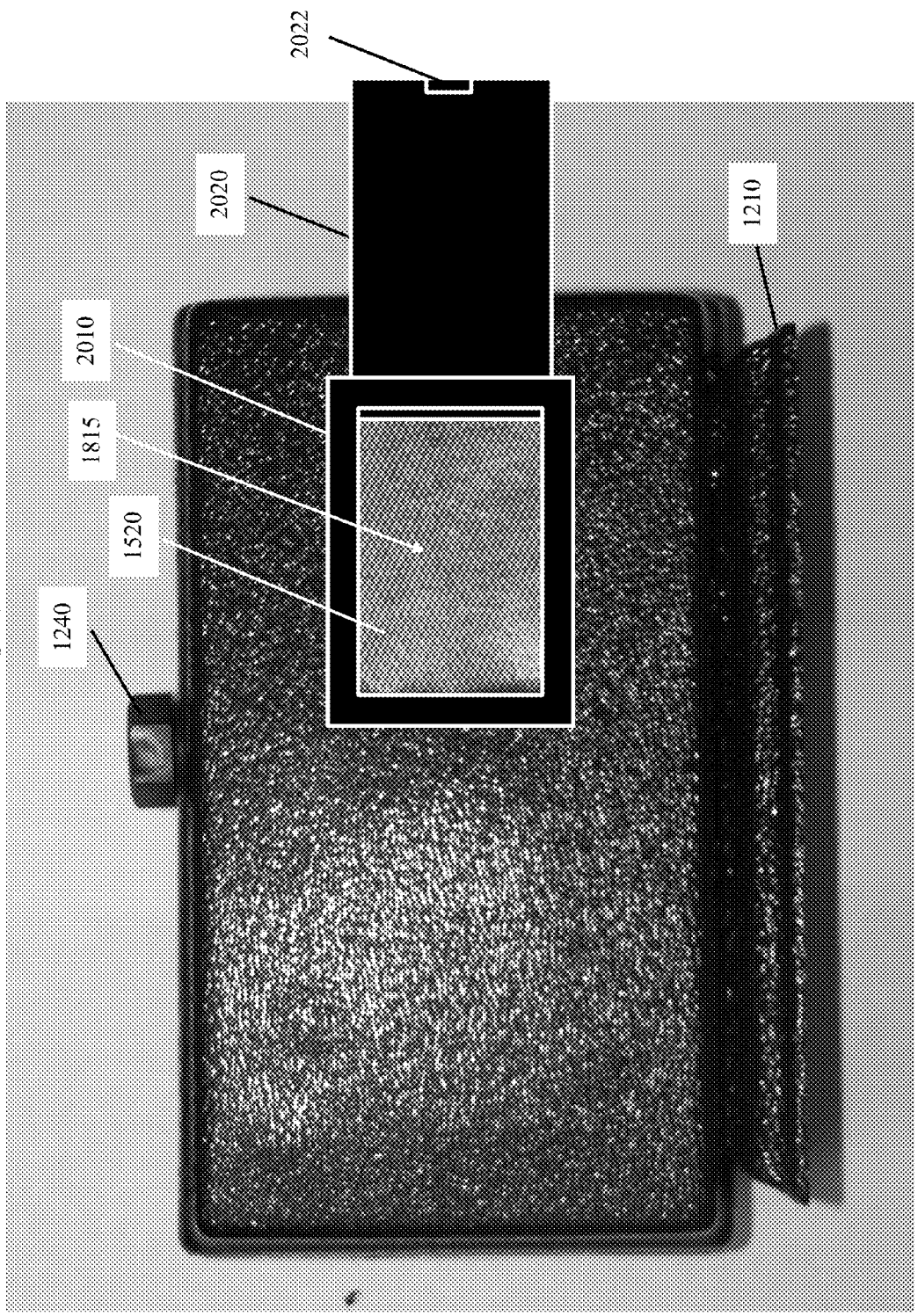
FIG. 20 is a front view of the battery charger of FIG. 19 with the sealable sliding window cover positioned over a cathode window on a front of the battery charger where the sliding window is slidable to the side of the front of the battery charger, in accordance with the still yet another embodiment of the present invention.

FIG. 20 is a front view of the battery charger of FIG. 19 with the sealable sliding window cover positioned over a cathode window on a front of the battery charger where the sliding window is slidable to the side of the front of the battery charger, in accordance with the still yet another embodiment of the present invention. In FIG. 20, a sliding window 2020 and frame 2010 are positioned over the cathode window 1415 and cathode 1420 to permit the opening and closing of the sliding window 2020 to cover the cathode window 1415 and cathode 1420 to stop the flow of air to the cathode 1420, which in turn stops the battery charger from generating and outputting power. Sliding window 2020 includes a handle/stop portion 2022, which can be used to open and close the sliding window 2020, and a bottom surface that forms a generally air-tight seal with the back wall 1410 when it is in the closed position, i.e., when it is completely within the frame 2110 and over the cathode window 1420. This may be accomplished by having the sliding window 2020 be tightly held against the back wall 1410 and/or providing an additional sealing layer of air-tight material on the bottom of the sliding window 2020 and/or on the back wall 1410 under the frame 2010. In general frame 2010 includes slots along the long and short sides into which the sliding window 2020 is slidingly engaged.

Figure 21:
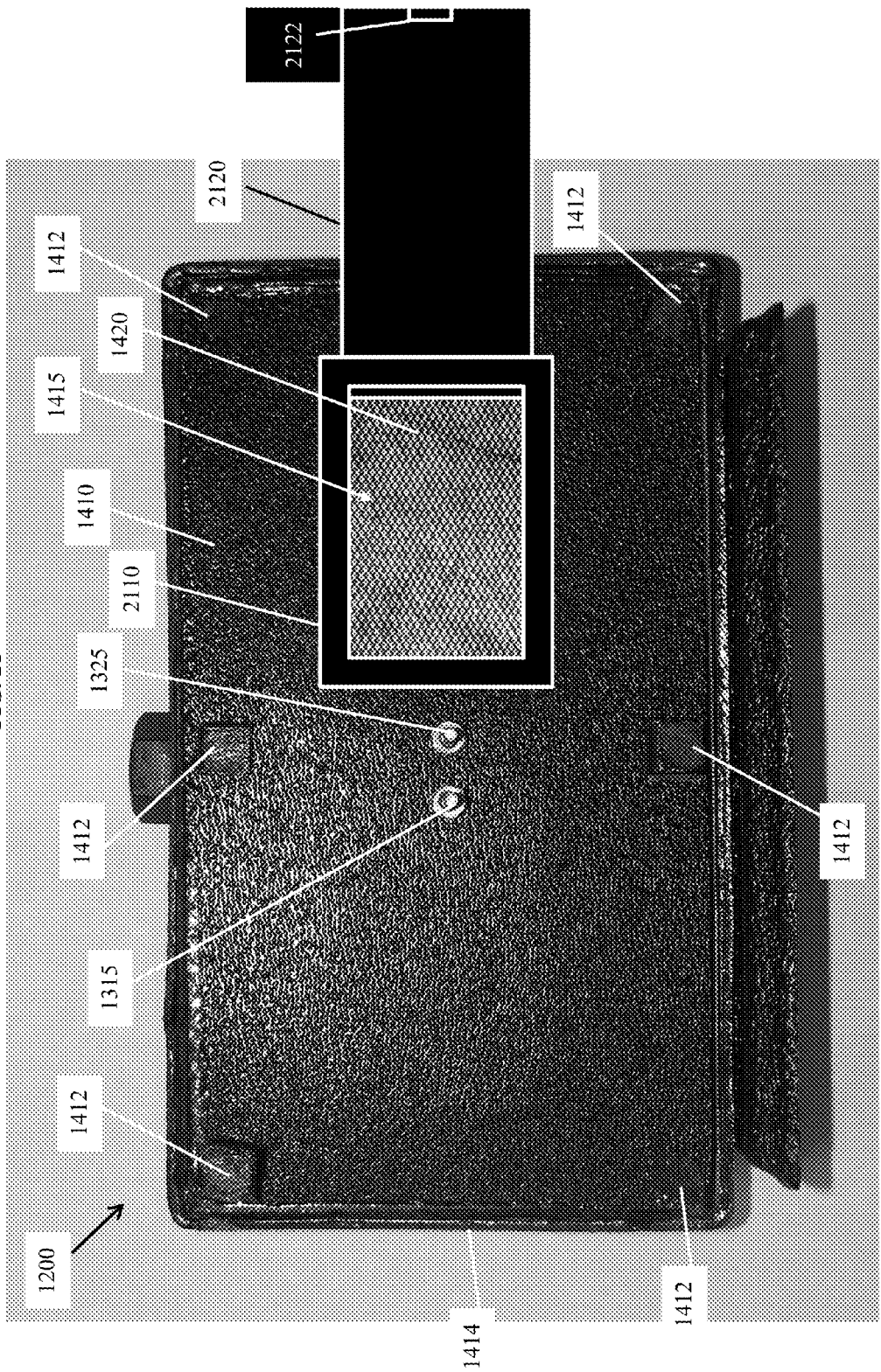
FIG. 21 is a back view of the battery charger of FIG. 19 with the sealable sliding window cover positioned over a cathode window on a back of the battery charger where the sliding window is slidable to the side of the back of the battery charger, in accordance with the still yet another embodiment of the present invention.

FIG. 21 is a back view of the battery charger of FIG. 19 with the sealable sliding window cover positioned over a cathode window on a back of the battery charger where the sliding window is slidable to the side of the back of the battery charger, in accordance with the still yet another embodiment of the present invention. In FIG. 21, and similar to FIGS. 19 and 20, a sliding window 2120 and frame 2110 are positioned over the cathode window 1415 and cathode 1420 to permit the opening and closing of the sliding window 2120 to cover the cathode window 1415 and cathode 1420 to stop the flow of air to the cathode 1420, which in turn stops the battery charger from generating and outputting power. Sliding window 2120 includes a handle/stop portion 2122, which can be used to open and close the sliding window 2120, and a bottom surface that forms a generally air-tight seal with the back wall 1410 when it is in the closed position, i.e., when it is completely within the frame 2110 and over the cathode window 1420. This may be accomplished by having the sliding window 2120 be tightly held against the back wall 1410 and/or providing an additional sealing layer of air-tight material on the bottom of the sliding window 2120 and/or on the back wall 1410 under the frame 2110. In general frame 2110 includes slots along the long and short sides into which the sliding window 2120 is slidingly engaged. Because cathode 1420 is covered by the battery plate 1311 and terminals 1315 and 1325 are located in the middle of the back wall 1410, the sliding window 2122 is slightly longer than in FIGS. 19 and 20 in order to extend past the side of the back wall 1410 and be accessible by a user.

Figure 22:
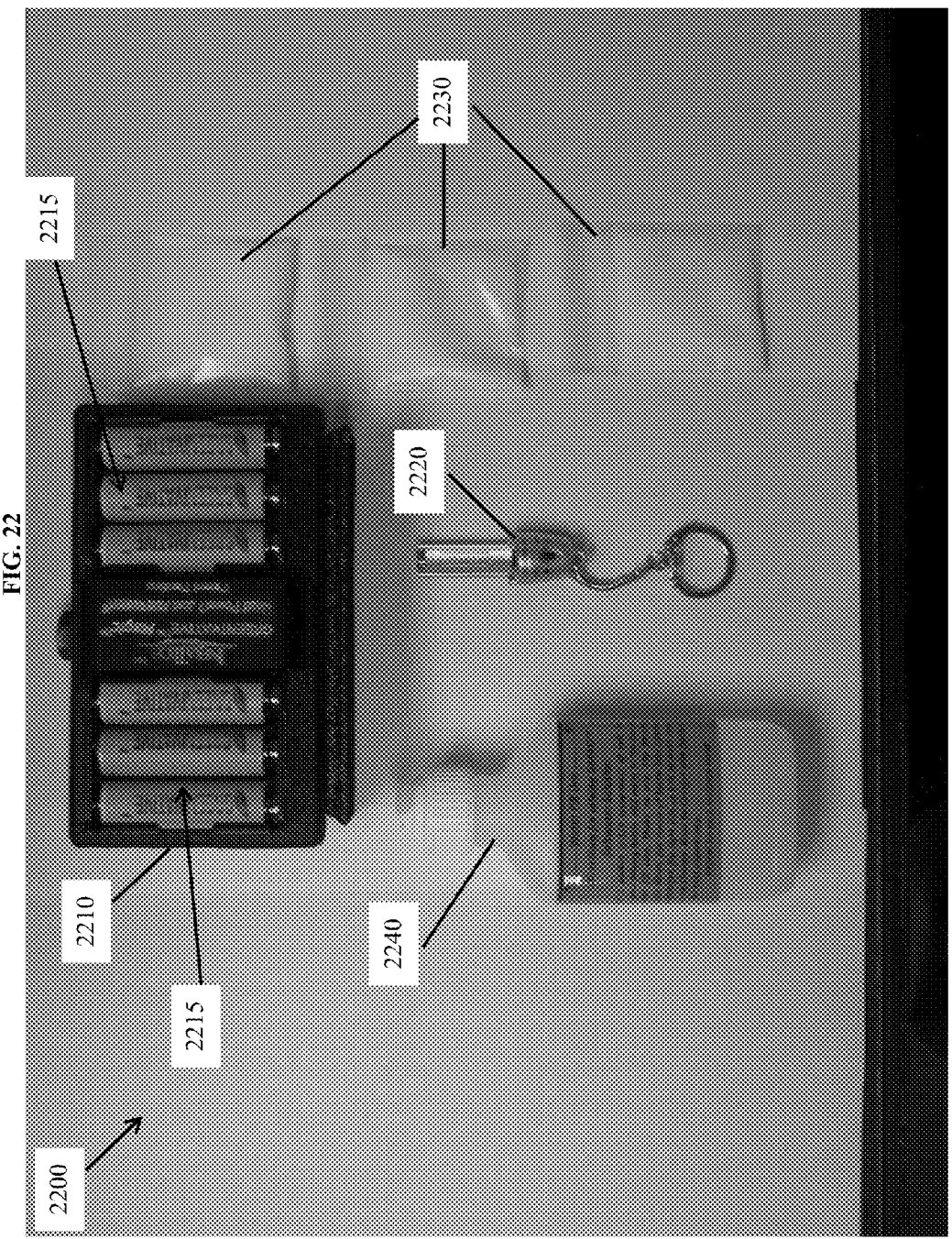
FIG. 22 is a plan view a battery charger kit, in accordance with another embodiment of the present invention.

FIG. 22 is a view a battery charger kit, in accordance with another embodiment of the present invention. In FIG. 22, a battery charger kit 2200 includes a battery charger 2210, at least one packet 2230 or container of 1.5 teaspoons of salt, a mixing bottle 2240 having a capacity of at least 4 ounces, and a battery tester 2220. The battery charger kit 2200 also includes a number of rechargeable batteries 2215, for example, in FIG. 22, six rechargeable batteries 2215 are provided, since there are six battery positions in the battery charger 2210. Other amounts of rechargeable batteries 2215 can also be provided, for example, none, twelve (or twice the number of battery positions in the battery charger 2210 to permit one set of batteries to be in use while the other set is being recharged), etc. In other embodiments, the kit does not include any rechargeable batteries. In still other embodiments, the battery charger can have more or less battery positions in the battery charger 2210.

In accordance with an embodiment of the present invention, a battery charger device design as substantially shown and described herein.

In accordance with an embodiment of the present invention, a battery charger device means as substantially shown and described herein.

In accordance with an embodiment of the present invention, a battery charger system design as substantially shown and described herein.

In accordance with an embodiment of the present invention, a battery charger system means as substantially shown and described herein.

In accordance with an embodiment of the present invention, a battery charger including: a water-tight body including a water fill opening defined in a top wall of the body, a cap removeably and sealing positioned in the water fill opening; at least one output gas opening defined in a wall of the body and sealingly covered by a gas-permeable, waterproof gas vent, a first cathode opening being defined in a front wall of the body and a second cathode opening being defined in a back wall of the body; a first anode affixed to an inside surface of the front wall of the body; a first cathode affixed to the inside surface of the front wall of the body and sealingly covering the first cathode opening, the first cathode being electrically connected to the first anode; a second anode affixed to an inside surface of the back wall of the body; a second cathode affixed to the inside surface of the back wall of the body and sealingly covering the second cathode opening, the second cathode being electrically separate from the second anode; a positive terminal connected to the second cathode and extending through and being affixed to the back wall of the body; a negative terminal connected to the second anode and extending through and being affixed to the back wall of the body; and at least one battery holder being electrically connected to the positive terminal at a positive end and electrically connected to the negative terminal at a negative end.

In accordance with an embodiment of the present invention, a fuel cell including: a water-tight body including a water fill opening defined in a top wall of the body, a cap removeably and sealing positioned in the water fill opening; at least one output gas opening defined in a wall of the body and sealingly covered by a gas-permeable, waterproof fabric, a first cathode opening being defined in a front wall of the body and a second cathode opening being defined in a back wall of the body; a first anode affixed to an inside surface of the front wall of the body; a first cathode affixed to the inside surface of the front wall of the body and sealingly covering the first cathode opening, the first cathode being electrically connected to the first anode; a second anode affixed to an inside surface of the back wall of the body; a second cathode affixed to the inside surface of the back wall of the body and sealingly covering the second cathode opening, the second cathode being electrically separate from the second anode; a positive terminal connected to the second cathode and extending through and being affixed to the back wall of the body; and a negative terminal connected to the second anode and extending through and being affixed to the back wall of the body.

In accordance with an embodiment of the present invention, a battery charger including: means for producing a current; means for holding at least one rechargeable battery; and means for connecting the current producing means to the holding means.

In accordance with an embodiment of the present invention, a fuel cell including: means for producing a current;

means for outputting the produced current; and means for connecting the current producing means to the outputting means.

In accordance with an embodiment of the present invention, a battery charger kit including: a saltwater-powered battery charger; a water bottle; and at least 1.5 teaspoons of salt.

In accordance with an embodiment of the present invention, a battery charger/fuel cell including: a water-tight body including a water fill opening defined in a top wall of the body, a cap removeably and sealing positioned in the water fill opening; at least one output gas opening defined in a wall of the body and sealingly covered by a gas-permeable, waterproof gas vent, a first plurality of cathode openings being defined in a front wall of the body and a second plurality of cathode openings being defined in a back wall of the body; a first plurality of anodes affixed to an inside surface of the front wall of the body; a first plurality of cathodes affixed to the inside surface of the front wall of the body and sealingly covering the first plurality of cathode openings, each of the first plurality of cathodes being electrically connected to one of the first plurality of anodes to form two separate anode cathode pairs; a second plurality of anodes affixed to an inside surface of the back wall of the body; a second plurality of cathodes affixed to the inside surface of the back wall of the body and sealingly covering the second plurality of cathode openings, one of the second plurality of cathodes being electrically connected to one of the second plurality of anodes, another one of the second plurality of cathodes being electrically separate from another one of the second plurality of anodes; a positive terminal connected to the another one of the second plurality of cathodes and extending through and being affixed to the back wall of the body; a negative terminal connected to the another one of the second plurality of anodes and extending through and being affixed to the back wall of the body; and two internal walls extending from the inside of the front wall to the inside of the back wall and with a first being positioned between the another one of the second plurality of anodes and the one of the second plurality of cathodes and a second being positioned between the another one of the second plurality of cathodes and the one of the second plurality of anodes.

In accordance with an embodiment of the present invention, a method of charging a rechargeable battery including placing at least one rechargeable battery having less than a full charge in a battery holder connected to a saltwater-powered fuel cell, waiting for the at least one rechargeable battery to recharge to substantially a full charge, and removing the recharged at least one rechargeable battery from the battery holder. The method also includes filling the saltwater-powered fuel cell with a mixture of about four (4) ounces of water mixed with about 1.5 teaspoons of salt, and sealingly closing the saltwater-powered fuel cell to start the saltwater-powered fuel cell. The method can further include adding a flocculent to the salt and water mixture in the fuel cell. The method can still further include emptying the saltwater from the saltwater-powered fuel cell after recharging is complete. Alternatively, the exterior sides of the cathode openings can be sealingly covered to prevent air from contacting the back side of the cathodes after recharging is complete.

While the invention(s) has/have been described in conjunction with a number of embodiments, it is evident that many alternatives, modifications and variations would be or are apparent to those of ordinary skill in the applicable arts. For example, different component designs and/or elements only shown in association with a particular embodiment also may be used with the other embodiments. Accordingly, Applicants intend to embrace all such alternatives, modifications, equivalents, and variations that are within the spirit and scope of the invention(s) described herein.

What is claimed is:

1. A battery charger comprising:
    a water-tight body including a water fill opening defined in a top wall of the body, a cap removeably and sealing positioned in the water fill opening; at least one output gas opening defined in a wall of the body and sealingly covered by a gas-permeable, waterproof gas vent, a first cathode opening being defined in a front wall of the body and a second cathode opening being defined in a back wall of the body;
    a first anode affixed to an inside surface of the front wall of the body;
    a first cathode affixed to the inside surface of the front wall of the body and sealingly covering the first cathode opening, the first cathode being electrically connected to the first anode;
    a second anode affixed to an inside surface of the back wall of the body;
    a second cathode affixed to the inside surface of the back wall of the body and sealingly covering the second cathode opening, the second cathode being electrically separate from the second anode;
    a positive terminal connected to the second cathode and extending through and being affixed to the back wall of the body;
    a negative terminal connected to the second anode and extending through and being affixed to the back wall of the body; and
    at least one battery holder being electrically connected to the positive terminal at a positive end and electrically connected to the negative terminal at a negative end.

2. The battery charger of claim 1 wherein the first anode and the second cathode are positioned substantially directly opposite each other and the second anode and the first cathode are positioned substantially directly opposite each other.

3. The battery charger of claim 1 wherein the at least one output gas opening is defined in the top wall of the body.

4. The battery charger of claim 1 wherein the at least one output gas opening comprises:
    two output gas openings defined in the top wall of the body.

5. The battery charger of claim 1 wherein the gas vent comprises:
    a bottom portion having a substantially cylindrical solid body and plurality of channels defined longitudinally through the cylindrical body;
    a top portion having a substantially cylindrical body defining an internal opening in which the bottom portion is sealingly affixed, the top portion having a cylindrical top component connected to a top of the substantially cylindrical body and having an opening defined there through and in fluid communication with the internal opening of the top portion; and
    a gas-permeable, waterproof layer sealed over the plurality of channels in the bottom portion.

6. The battery charger of claim 1 wherein each of the first anode and the second anode comprises:
    about a 0.45 in$^3$ piece of magnesium.

7. The battery charger of claim 1 further wherein the first anode and the second cathode are positioned substantially directly opposite each other and the second anode and the first cathode are positioned substantially directly opposite each other.

8. The battery charger of claim 1 wherein each of the first cathode and the second cathode comprises:

a gas-permeable, waterproof fabric having a carbon-based coating on a side of the cathode that is positioned on an inside of the body of the battery charger and directly opposite the anode.

9. The battery charger of claim 1 wherein the at least one battery holder comprises:
two three-position AA battery holders with the three positions connected in parallel in each AA battery holder.

10. The battery charger of claim 1 further comprising:
a volume of saltwater sealed within the body and in contact with the first and second anodes and the first and second cathodes and the volume of salt water to anode volume is about 13:1.

11. The battery charger of claim 10 wherein the volume of saltwater further comprises:
a flocculent.

12. A fuel cell comprising:
a water-tight body including a water fill opening defined in a top wall of the body, a cap removeably and sealing positioned in the water fill opening; at least one output gas opening defined in a wall of the body and sealingly covered by a gas-permeable, waterproof fabric, a first cathode opening being defined in a front wall of the body and a second cathode opening being defined in a back wall of the body;
a first anode affixed to an inside surface of the front wall of the body;
a first cathode affixed to the inside surface of the front wall of the body and sealingly covering the first cathode opening, the first cathode being electrically connected to the first anode;
a second anode affixed to an inside surface of the back wall of the body;
a second cathode affixed to the inside surface of the back wall of the body and sealingly covering the second cathode opening, the second cathode being electrically separate from the second anode;
a positive terminal connected to the second cathode and extending through and being affixed to the back wall of the body; and
a negative terminal connected to the second anode and extending through and being affixed to the back wall of the body.

13. The fuel cell of claim 12 wherein the first anode and the second cathode are positioned substantially directly opposite each other and the second anode and the first cathode are positioned substantially directly opposite each other.

14. The fuel cell of claim 12 wherein the cap includes a cap top, a threaded screw portion attached to the bottom of and extending away from a bottom side of the cap, and a rubber "O"-ring fitted over the threaded screw portion and positioned adjacent the bottom side of the cap.

15. The fuel cell of claim 12 wherein each of the first anode and the second anode comprises:
about a 0.45 $in^3$ piece of magnesium.

16. The fuel cell of claim 12 further wherein the first anode and the second cathode are positioned substantially directly opposite each other and the second anode and the first cathode are positioned substantially directly opposite each other.

17. The fuel cell of claim 12 wherein each of the first cathode and the second cathode comprises:
a gas-permeable, waterproof fabric having a carbon-based coating on a side of the cathode that is positioned on an inside of the body of the battery charger and directly opposite the anode.

18. The fuel cell of claim 12 further comprising:
a volume of saltwater sealed within the body and in contact with the first and second anodes and the first and second cathodes and the volume of salt water to anode volume is about 13:1.

\* \* \* \* \*